US008851587B2

(12) United States Patent
Brock et al.

(10) Patent No.: US 8,851,587 B2
(45) Date of Patent: Oct. 7, 2014

(54) HEAVY-DUTY SLIDE ASSEMBLY

(75) Inventors: Patty J. Brock, Irvine, CA (US); Ronald J. Judge, Corona, CA (US)

(73) Assignee: Jonathan Manufacturing Corporation, Irvine, CA (US)

( * ) Notice: Subject to any disclaimer, the term of this patent is extended or adjusted under 35 U.S.C. 154(b) by 104 days.

(21) Appl. No.: 13/541,439

(22) Filed: Jul. 3, 2012

(65) Prior Publication Data

US 2013/0058599 A1   Mar. 7, 2013

Related U.S. Application Data

(60) Provisional application No. 61/504,663, filed on Jul. 5, 2011.

(51) Int. Cl.
  *A47B 88/00*  (2006.01)
  *F16C 29/04*  (2006.01)
(52) U.S. Cl.
  CPC .................................. *F16C 29/045* (2013.01)
  USPC ................................................... 312/334.39
(58) Field of Classification Search
  USPC ................. 384/19; 312/333, 334.6,
       312/334.14–334.18, 334.27,
       312/334.29–334.33, 334.36–334.39,
       312/334.44, 334.46
  See application file for complete search history.

(56) References Cited

U.S. PATENT DOCUMENTS

| 4,091,933 | A  | * | 5/1978  | Alexander ..................... 211/204 |
| 4,236,773 | A  | * | 12/1980 | Mertes ...................... 312/334.36 |
| 4,441,772 | A  | * | 4/1984  | Fielding et al. ............. 312/330.1 |
| RE32,134  | E  | * | 5/1986  | Gutner et al. ................... 384/19 |
| 5,417,490 | A  |   | 5/1995  | Hobbs et al. |
| 5,484,197 | A  |   | 1/1996  | Hansen et al. |
| 5,876,103 | A  | * | 3/1999  | Domenig ................... 312/334.4 |
| 7,140,704 | B2 | * | 11/2006 | Chen et al. ............... 312/334.44 |
| 7,517,029 | B2 | * | 4/2009  | Cvek .............................. 312/196 |
| 7,690,740 | B2 | * | 4/2010  | Blum ....................... 312/334.45 |
| 2005/0138956 | A1 | * | 6/2005 | Okuda et al. ..................... 62/441 |
| 2006/0279187 | A1 | * | 12/2006 | Yang et al. ..................... 312/333 |

* cited by examiner

*Primary Examiner* — Matthew Ing
(74) *Attorney, Agent, or Firm* — Knobbe, Martens, Olson & Bear, LLP

(57) ABSTRACT

A slide assembly having an outer segment, an intermediate segment, and an inner segment telescopically engaged with one another. The slide assembly includes forward pair of rollers and a rearward pair of rollers having a diameter that is greater than a diameter of the forward pair of rollers. The outer segment includes a protrusion that limits vertical movement of the intermediate slide segment. The intermediate segment includes a stop member arranged to contact a portion of the inner segment to limit vertical movement of the inner segment relative to the intermediate segment. The inner segment includes a stop arrangement that contacts the intermediate segment to define a closed position of the inner segment. The outer segment includes a stop member and a strengthening rib is positioned near a surface of the intermediate segment that contacts the stop member.

24 Claims, 21 Drawing Sheets

HEAVY-DUTY SLIDE ASSEMBLY

CROSS-REFERENCE TO RELATED APPLICATIONS

This application is related to and claims the benefit of U.S. Provisional Patent Application No. 61/504,663, filed Jul. 5, 2011, the entirety of which is hereby incorporated by reference herein.

BACKGROUND OF THE INVENTION

1. Field of the Invention

The present invention generally relates to slide assemblies. In particular, the present invention relates to slide assemblies that are durable and well-suited for use in heavy-duty applications.

2. Description of the Related Art

Slide assemblies are often used to movably support a movable object, such as a drawer, relative to a stationary object, such as a cabinet, enclosure or other support structure. A slide assembly typically includes a first slide segment that is telescopically engaged, either directly or through one or more intermediate slide segments, with a second slide segment. The first slide segment can be coupled to the cabinet or enclosure and the second slide segment can coupled to the drawer. The first, second and any intermediate slide segments can be provided in a variety of shapes to suit a particular application. Often, bearing arrangements, such as ball bearings or rollers, are provided to transfer load and motion between the individual slide segments.

In many applications, users expect slide assemblies to have a high load-carrying capacity and occupy a minimal amount of space. In addition, the slide assemblies are expected to have a long service life in harsh environments, such as exposure to large impacts (e.g., high opening or closing forces), large vibrations (e.g., high amplitude and/or frequency) or harsh chemicals. For example, slide assemblies used in emergency vehicle (e.g., fire truck, ambulance) applications often experience high loads, large impacts and vibrations, and exposure to harsh chemicals. The high loads are a result of the large amount of equipment that is carried within the confined space of the vehicle, which results in each drawer being filled to or near its capacity. The large impacts occur because the usually heavy drawers are opened or closed at a high rate of speed and/or with a high force due to the time sensitive nature of the activities in which an emergency vehicle is involved. The large vibrations are due to the high loads carried by drawers being subjected to forces typical in a moving vehicle.

SUMMARY OF THE INVENTION

As a result, there exists a need for continuously improved slide assembly designs. One or more embodiments of the present disclosure provide a heavy duty slide assembly having some or all of: a relatively high load-carrying capacity, resistance to harsh chemicals and the ability to withstand large vibration forces.

1. A preferred embodiment involves a slide assembly, which includes an outer slide segment having a forward end and a rearward end. The outer slide segment includes a web, a pair of spaced-apart side walls extending from the web and a pair of return flanges extending inwardly from a respective one of the side walls. An intermediate slide segment is telescopically engaged with the outer slide segment. The intermediate slide segment has a forward end and a rearward end. The intermediate slide segment includes a web, a pair of spaced-apart side walls and a pair of flanges extending outwardly from a respective one of the side walls. The slide assembly also includes an inner slide segment telescopically engaged with the intermediate slide segment. The inner slide segment has a forward end and a rearward end. A first plurality of rollers slidably supports the intermediate slide segment relative to the outer slide segment and a second plurality of rollers slidably supports the inner slide segment relative to the intermediate slide segment. A forward end of each of the pair of return flanges of the outer slide segment includes a protrusion extending towards a respective one of the flanges of the intermediate slide segment. The protrusion is arranged to contact the flange of the intermediate slide segment to limit vertical movement of the intermediate slide segment relative to the outer slide segment. A rearward end of the intermediate slide segment includes at least one stop member arranged to contact a portion of the inner slide segment to limit vertical movement of the inner slide segment relative to the intermediate slide segment.

2. The slide assembly of paragraph 1, wherein the at least one stop member includes a pair of stop members that are formed as bent tabs from the material of the intermediate slide segment.

3. The slide assembly of paragraph 2, wherein the inner slide segment includes a web, a lower flange and an upper platform, and the pair of stop members are positioned above the lower flange of the inner slide segment.

4. The slide assembly of paragraph 1, wherein a forward end of the inner slide segment includes a stop arrangement that contacts at least one of the intermediate slide segment and the outer slide segment to define a closed position of the inner slide segment. The stop arrangement includes at least one stop member coupled to the inner slide segment, wherein each of the at least one stop member and a portion of the inner slide segment defines a portion of the stop arrangement.

5. The slide assembly of paragraph 4, wherein the at least one stop member includes a first stop member and a second stop member, and wherein the first stop member and the second stop member are positioned on opposite sides of the portion of the inner slide segment.

6. The slide assembly of paragraph 4, wherein the stop arrangement contacts only the intermediate slide segment.

7. The slide assembly of paragraph 1, wherein the outer slide segment includes a stop member at a rearward end, the stop member being coupled to the outer slide segment by a plurality of fasteners, and the stop member contacts at least one of the intermediate and inner slide segments to inhibit the slide assembly from moving beyond the closed position.

8. The slide assembly of paragraph 7, wherein the intermediate slide segment includes a strengthening rib positioned near a surface of the intermediate slide segment that contacts the stop member.

9. The slide assembly of paragraph 7, wherein the stop member only contacts the intermediate slide segment.

10. The slide assembly of paragraph 1, wherein the first plurality of rollers includes a forward pair of rollers and a rearward pair of rollers, wherein a diameter of the rearward pair of rollers is greater than a diameter of the forward pair of rollers.

11. The slide assembly of paragraph 10, wherein the rearward pair of rollers is carried by the intermediate slide segment, wherein the diameter of the rearward pair of rollers is at least 95 percent of a vertical distance between an upper surface of the web and a lower surface of the return flange of the outer slide segment.

12. The slide assembly of paragraph 11, wherein the diameter of the rearward pair of rollers is about 97-99 percent of the vertical distance between the upper surface of the web and the lower surface of the return flange of the outer slide segment.

13. A preferred embodiment involves a slide assembly, which includes an outer slide segment having a forward end and a rearward end. The outer slide segment includes a web, a pair of spaced-apart side walls extending from the web and a pair of return flanges extending inwardly from a respective one of the side walls. An intermediate slide segment is telescopically engaged with the outer slide segment. The intermediate slide segment has a forward end and a rearward end. The intermediate slide segment includes a web, a pair of spaced-apart side walls and a pair of flanges extending outwardly from a respective one of the side walls. The slide assembly also includes an inner slide segment telescopically engaged with the intermediate slide segment. The inner slide segment has a forward end and a rearward end. A first plurality of rollers slidably supports the intermediate slide segment relative to the outer slide segment. The first plurality of rollers includes a forward pair of rollers and a rearward pair of rollers and a diameter of the rearward pair of rollers is greater than a diameter of the forward pair of rollers. A second plurality of rollers slidably supports the inner slide segment relative to the intermediate slide segment. A forward end of each of the pair of return flanges of the outer slide segment includes a protrusion extending towards a respective one of the flanges of the intermediate slide segment. The protrusion is arranged to contact the flange of the intermediate slide segment to limit vertical movement of the intermediate slide segment relative to the outer slide segment. A rearward end of the intermediate slide segment includes at least one stop member arranged to contact a portion of the inner slide segment to limit vertical movement of the inner slide segment relative to the intermediate slide segment. A forward end of the inner slide segment includes a stop arrangement that contacts the intermediate slide segment to define a closed position of the inner slide segment. The stop arrangement includes a pair of stop members coupled to the inner slide segment. Each of the pair of stop members and a portion of the inner slide segment defines a portion of the stop arrangement. The outer slide segment includes a stop member at a rearward end. The stop member is coupled to the outer slide segment by a plurality of fasteners, and the stop member contacts the intermediate slide segment to define a closed position of the intermediate slide segment. The intermediate slide segment includes a strengthening rib positioned near a surface of the intermediate slide segment that contacts the stop member.

14. A preferred embodiment involves a slide assembly, which includes an outer slide segment having a first end. An intermediate slide segment is telescopically engaged with the outer slide segment. An inner slide segment is telescopically engaged with the intermediate slide segment. A first plurality of rollers slidably supports the intermediate slide segment relative to the outer slide segment and a second plurality of rollers that slidably supports the inner slide segment relative to the intermediate slide segment. At least the second plurality of rollers are constructed of a plastic material. The slide assembly has a closed position in which the slide segments are telescopically compressed and an open position in which the slide segments are telescopically extended.

15. The slide assembly of paragraph 14, wherein the first plurality of rollers and the second plurality of rollers comprise a plastic material.

16. The slide assembly of paragraph 14, wherein the inner slide segment supports a lock mechanism having an actuation portion and a latch portion. The latch portion is configured to engage a recess on the outer slide to inhibit movement of the inner slide segment toward the open position. The actuation portion includes a bend and a horizontal portion that facilitates actuation of the lock mechanism by a user.

17. The slide assembly of paragraph 14, wherein the outer slide segment includes a stop member adjacent the first end. The stop member is coupled to the outer slide segment by a plurality of screws. The stop member contacts at least one of the intermediate and inner slide segments to inhibit the slide assembly from moving beyond the closed position.

18. The slide assembly of paragraph 17, wherein the intermediate slide segment comprises a strengthening rib positioned near a surface of the intermediate slide segment that contacts the stop member.

BRIEF DESCRIPTION OF THE DRAWINGS

These and other features, aspects and advantages of the heavy duty slide assembly are described herein with reference to drawings of certain preferred embodiments, which are provided for purposes of illustration and not limitation. The drawings contain twenty-one (21) figures.

FIG. 1 illustrates the slide assembly in an open position.

In FIG. 4, the front end of the slide assembly is to the left and the rear end of the slide assembly is to the right.

In FIG. 5, the rear end of the slide assembly is to the left and the front end of the slide assembly is to the right.

DETAILED DESCRIPTION OF THE PREFERRED EMBODIMENTS

Figure 1:
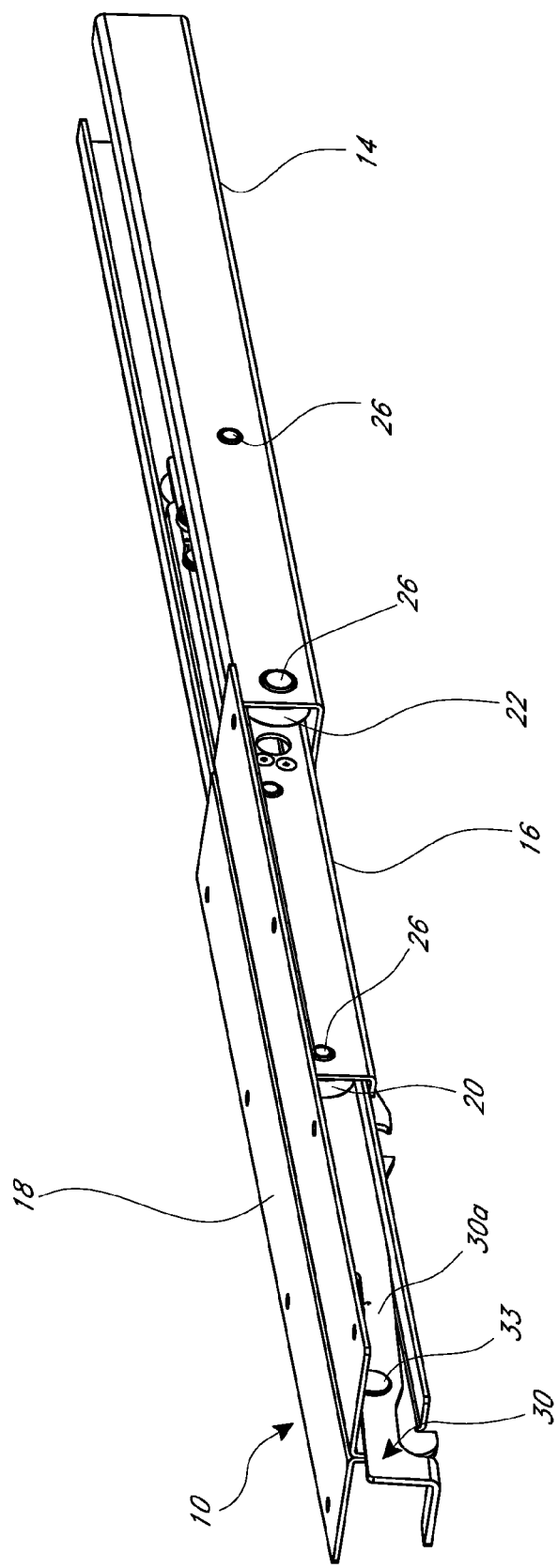
FIG. 1 is a perspective view of an embodiment of a slide assembly having an outer slide segment, an intermediate slide segment and an inner slide segment.
Figure 2:
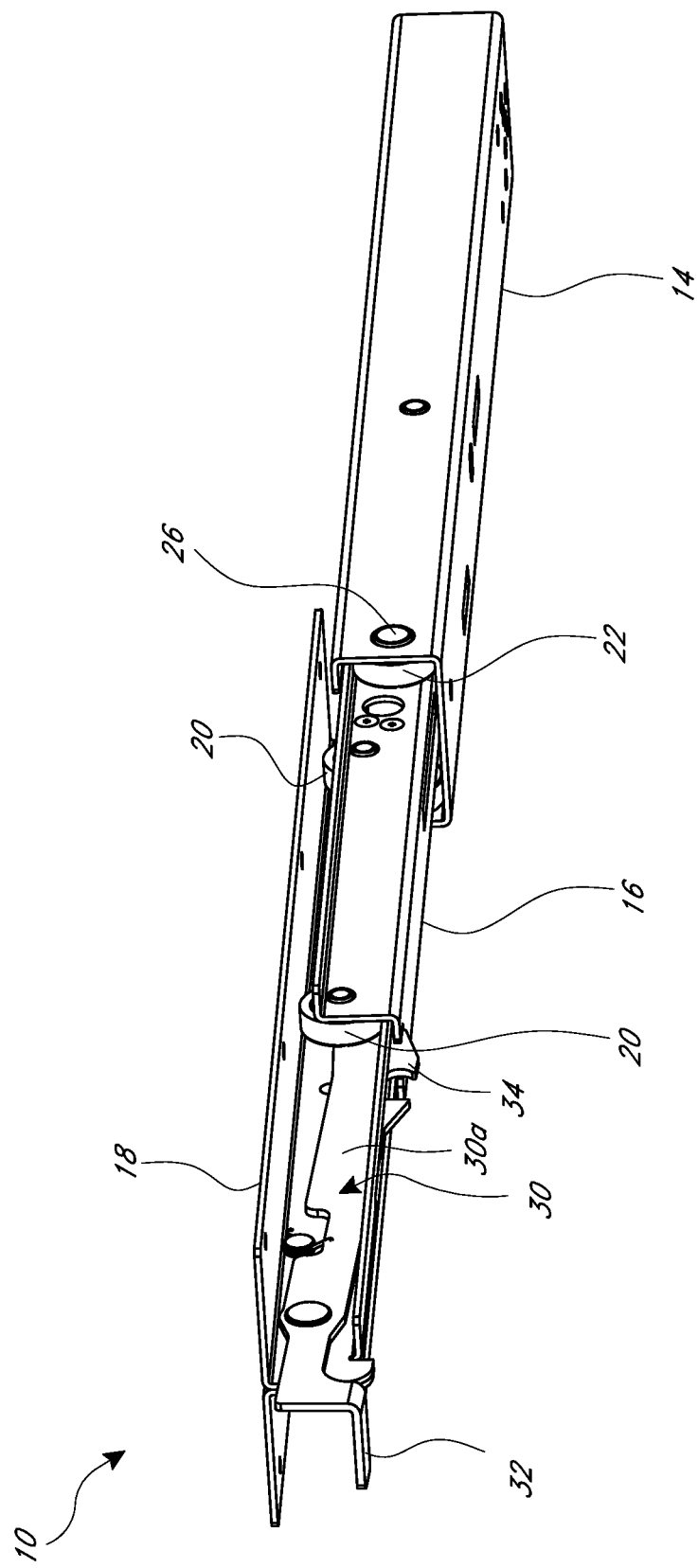
FIG. 2 is another perspective view of the slide assembly of FIG. 1.
Figure 3:
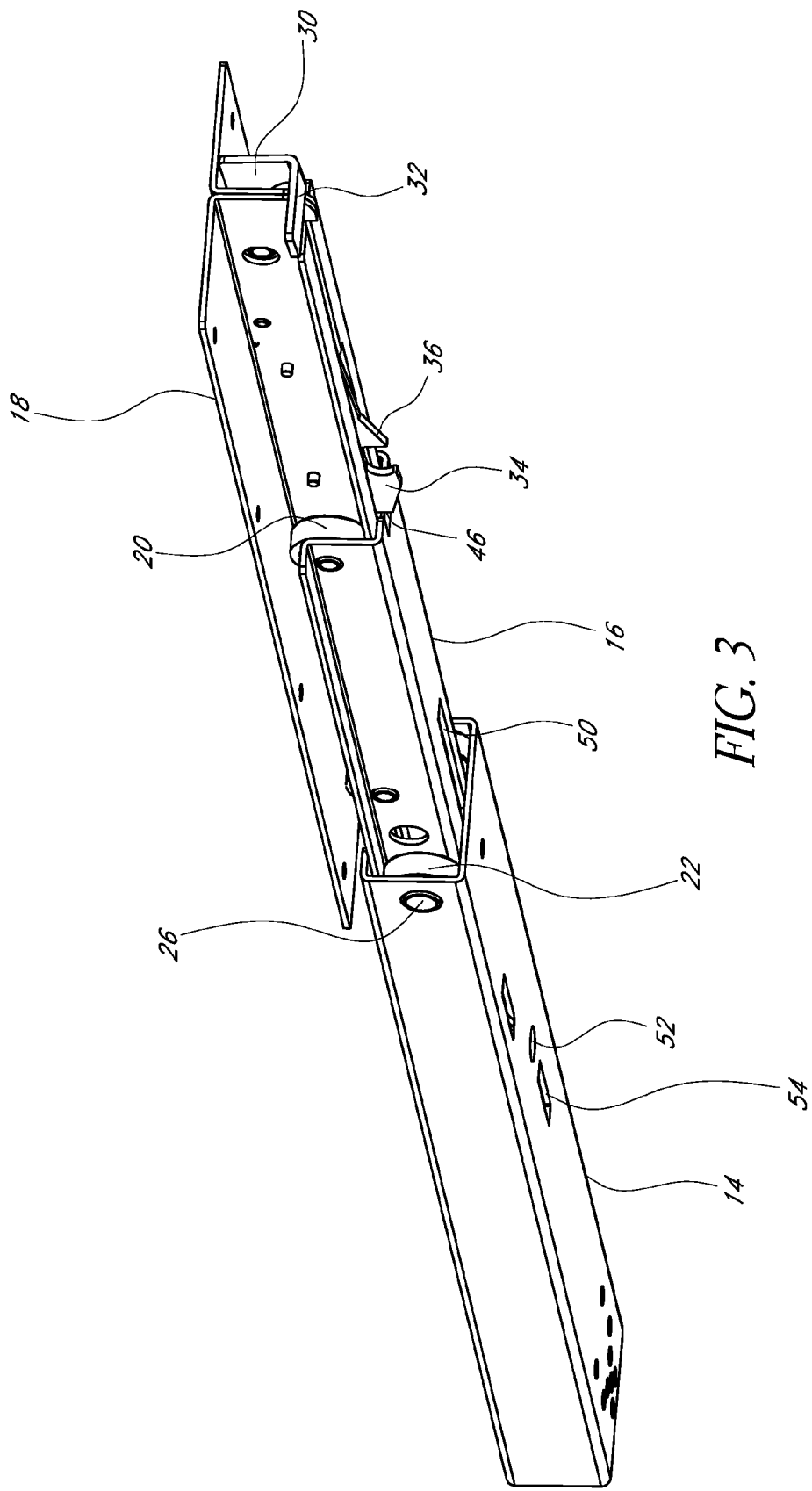
FIG. 3 is a perspective view of the opposite side of the slide assembly of FIG. 1.
Figure 4:
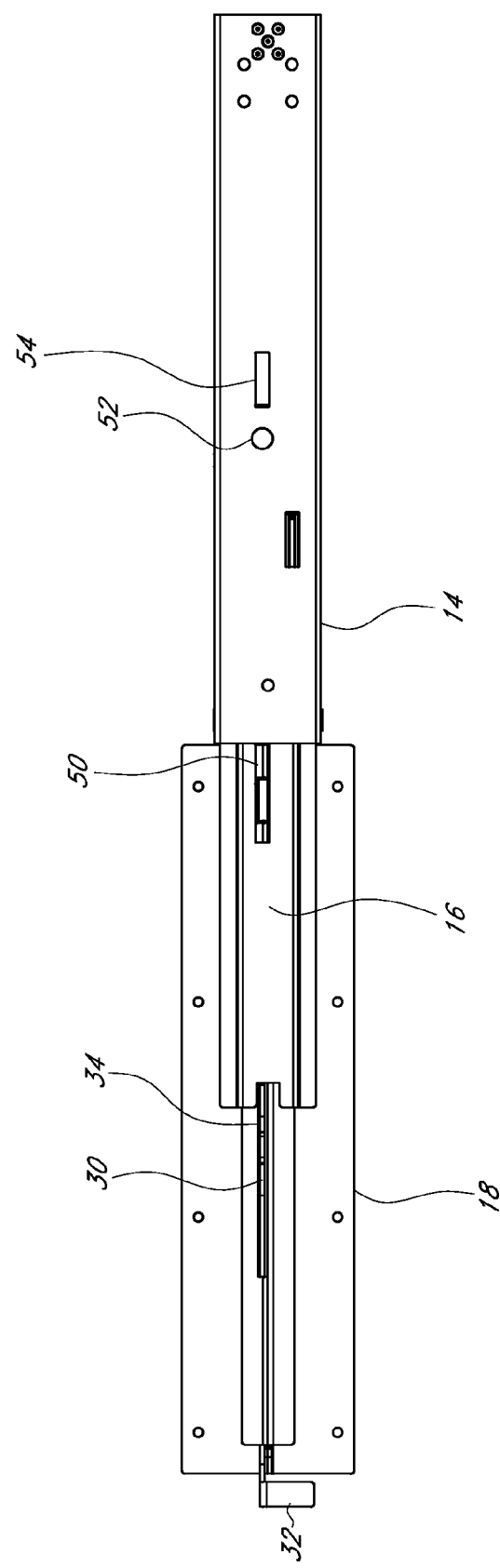
FIG. 4 is a bottom view of the slide assembly of FIG. 1.
Figure 5:
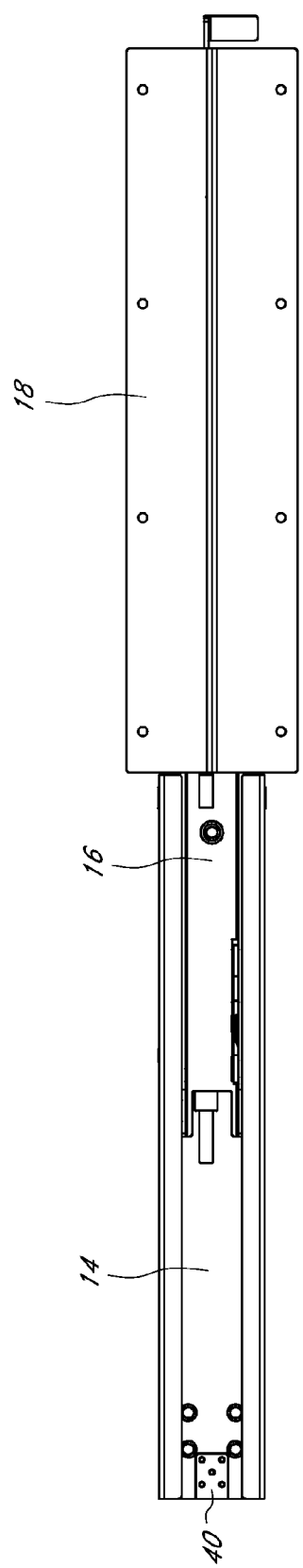
FIG. 5 is a top view of the slide assembly of FIG. 1.

Preferred embodiments of the slide assemblies include between two and four (or possibly more) slide members telescopically engaged with one another to move between a closed position and an open position. The slide members may also be referred to as channels or segments herein. The slide members or segments may be any suitable shape to permit telescopic engagement between the segments. Certain preferred cross-sectional shapes are illustrated and/or described herein. Typically, a slide assembly permits one object to be supported and moved relative to another object. One object is often stationary, such as an enclosure or rack, and the other object, such as a drawer or a tray, is movable between an open and closed position relative to the stationary object.

The preferred embodiments disclosed herein are well-suited for use in movably supporting drawers or trays in emergency vehicles. In particular, the preferred slide assemblies are robust and durable so that they can support heavy loads and large forces applied by the users. Preferably, the slide assemblies also include features that inhibit damage to the slide assemblies as a result of vibrations or dynamic vertical forces. In addition, preferred embodiments of the slide assemblies are generally chemical resistant, including fire-resistant hydraulic fluids, in particular. Furthermore, the slide assemblies can be manufactured in a cost-effective manner.

FIGS. 1-14 illustrate a preferred embodiment of a slide assembly 10. In the illustrated arrangement, the slide assembly 10 includes three slide members: an outer slide member 14, an intermediate slide member 16, and an inner slide member 18 telescopically engaged with one another and movable between a closed position and an open position. However, in other arrangements, the slide assembly 10 may include only two slide members, or perhaps more than three slide members. As described in greater detail hereinafter, the slide assembly 10 preferably includes one or more locking mechanisms that permit the various segments of the slide assembly 10 to be selectively locked in one or more relative positions, such as a closed position, an open position, and a partially open or closed position, among others.

The slide assembly 10 is configured to be secured to a stationary object, which in some applications is a drawer assembly (e.g., an enclosure or cabinet) in an emergency vehicle, such as a fire truck. Preferably, the outer slide segment 14 is supported by the enclosure or cabinet and is fixed with respect to the emergency vehicle. The inner slide segment 18 supports the drawer or other movable object and is movable with respect to the drawer assembly. However, in other embodiments, this arrangement could be reversed and the inner slide segment could be coupled to the enclosure or cabinet while the outer slide segment supports the drawer.

In the illustrated arrangement, the slide assembly 10 is designed to be installed beneath the drawer instead of on a side of the drawer, as is also common. Accordingly, an upper portion of the inner slide segment 18 defines a mounting platform, which can support the drawer or other object. One or more slide assemblies 10 can be used to support a single drawer.

The inner slide segment 18 is slidably supported by the intermediate slide segment 16. Rollers 20 are supported by the intermediate slide segment 16 and slidably support the inner segment 18. In the illustrated arrangement, two pairs of rollers 20 are provided and are spaced apart from one another in a longitudinal or lengthwise direction of the slide assembly 10. Preferably, a first pair of the rollers 20 are positioned at or near a forward end of the intermediate slide segment 16 and a second pair of the rollers 20 are positioned at an intermediate location on the intermediate segment 16, which generally corresponds with a rearward end of the inner slide segment 18 when the inner slide segment 18 is in an extended position.

The intermediate slide segment 16 is slidably supported relative to the outer slide segment 14 by rollers 22. In particular, two pairs of rollers 22 are provided, with a first pair of the rollers 22 supported by the outer slide segment 14 and a second pair of the rollers 22 supported by the intermediate slide segment 16. In the illustrated arrangement, the rollers 22 supported by the outer slide segment 14 are located at or near a forward end of the outer slide segment 14. Preferably, the rollers 22 supported by the intermediate slide segment 16 are located at or near the rearward end of the intermediate slide segment 16. Each pair of rollers 20, 22 are spaced on opposite lateral sides of the slide assembly 10. The rollers 20 and 22 allow a user to move the slide segments 14, 16, 18 relative to one another to move the telescoping slide assembly 10 between the closed position in which the segments 14, 16, 18 are retracted relative to one another and the open position in which the segments 14, 16, 18 are extended relative to one another.

Figure 6:
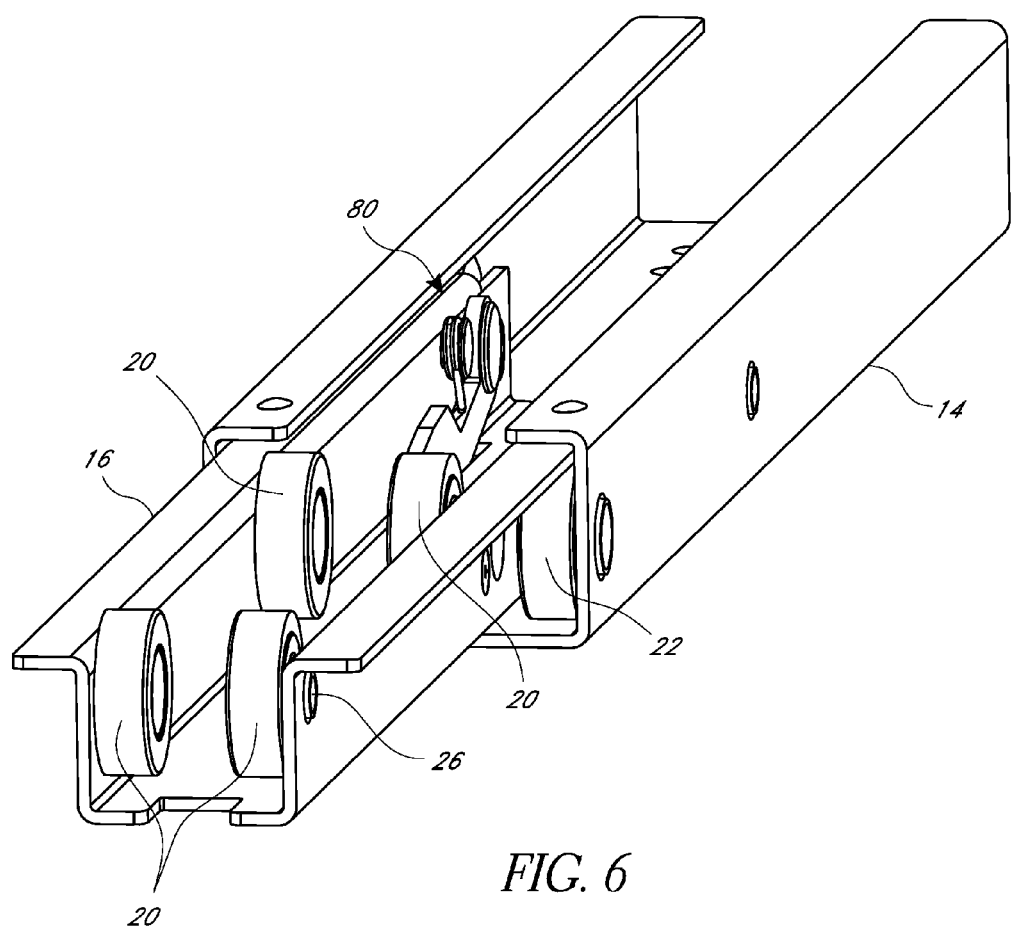
FIG. 6 is a perspective view of the intermediate and outer slide segments of the slide assembly of FIG. 1. The inner slide segment has been removed for clarity.

FIG. 6 illustrates the rollers 20 coupled to the intermediate slide segment 16. Preferably, the rollers 20 are rotatably supported relative to the intermediate slide segment 16. In one embodiment, the rollers 20 and/or 22 are secured to the slide segments by a stepped shoulder pin 26 that has a portion to rotatably support the rollers 20 and 22 and a portion that is staked or riveted to secure the pin 26 to the slide segment. Preferably, the rollers 20 and/or 22 comprise a plastic material and, more specifically, an acetal resin, which is a crystalline plastic made by the polymerization of formaldehyde. In one preferred embodiment, the rollers 20 and/or 22 comprise the acetal resin material sold by DuPont under the tradename DELRIN®. Using an acetal resin material results in the rollers 20 and/or 22 being very durable, chemically resistant and lower cost than metal roller bearing assemblies that are typically employed in heavy-duty slide applications.

Preferably, the rollers 20 and 22 are formed by an injection molding process. However, other suitable processes or a combination or processes, such as extrusion, stamping and machining, can also be used. In one arrangement, the rollers 20 and 22 preferably have a width between 0.4 and 0.5 inches and an outer diameter of about 1.37 inches or greater. Preferably, four rollers are provided between the inner segment 18 and intermediate segment 16 and four rollers are provided between the intermediate segment 16 and the outer segment 14. The rollers 20, 22 can all be the same size (width or diameter), or can be different sizes depending on the specific load requirements or other considerations at the location of the specific roller 20, 22. As determined by the testing conducted by the Applicants (summarized below), a combination of one or more of the material, size and number of the rollers employed unexpectedly provide similar functionality to metal roller bearing assemblies, while also being more reliable and less costly to manufacture. It is contemplated that the specific material, size or number of rollers can be scaled relative to the particulars disclosed herein to be suitable for other applications having lesser or greater load or other requirements.

The results of tests performed by the Applicants show that plastic slide rollers maintain sufficient integrity for their expected operation even after being exposed to fire resistant hydraulic fluid (MCS®-2361). After being sprayed with hydraulic fluid and loaded with 500 lbs for several days, the rollers had no significant statistical variation in their circularity, concentricity and dimensional readings. Also, the slide function remained normal with smooth operation, and the push and pull forces remained consistent for the tray supported by the rollers. Therefore, it was determined that the effects of fire resistant hydraulic fluid on the plastic rollers are insignificant relative to the ability of the roller to perform in the slide assembly.

The plastic rollers were also subjected to vibration testing. After 100 hours of being subjected to vibrations typical of those occurring in an emergency vehicle, the plastic rollers had no significant statistical variation in their circularity, concentricity and dimensional readings. The slide function remained normal with smooth operation and the push pull forces for the assembly remained consistent.

The plastic rollers were also tested to verify that they would not deform or flatten to where the slides are unusable after the drawer is fully loaded in the closed position for a two week time period. After being loaded with 500 lbs for 14 days, the drawer rollers unexpectedly had no significant variation in circularity, concentricity and dimensional readings. The slide function remained smooth and normal. Similarly, the pre-test and post-test push and pull forces remained consistent. Thus, the Applicants discovered the unexpected result that the tested plastic rollers were capable of meeting the functional criteria of the slide assembly.

The slide assembly 10 also includes a first lock mechanism 30 configured to permit the inner slide segment 18 to be selectively locked in one or more desired positions relative to the intermediate slide segment 16 and/or outer slide segment 14. Preferably, the lock mechanism 30 comprises a lock-arm 30a that is rotatably supported by the inner slide segment 18. The lock mechanism 30 preferably includes an actuation portion 32 that permits a user to operate the lock mechanism 30. In addition, the lock mechanism 30 preferably also includes a latch arrangement that engages the intermediate slide segment 16 and/or outer slide segment 14 to selectively lock the inner slide segment 18 in a desired position. In the illustrated arrangement, the latch arrangement has a first latch portion 34 and a second latch portion 36. Preferably, the lock mechanism 30 is arranged so that the first latch portion 34 engages a first recess 54 and the second latch portion 36 engages a second recess 52 (FIG. 3) on the outer slide segment 14 when the slide assembly 10 is in a particular position, such as a closed position in the illustrated arrangement. The intermediate slide segment 16 also includes an opening 50 aligned with the first latch portion 34 and second latch portion 36 in the particular position. Preferably, the first latch portion 34 and second latch portion 36 can extend into and through the opening 50 when the slide assembly 10 is in the closed position.

Figure 7:
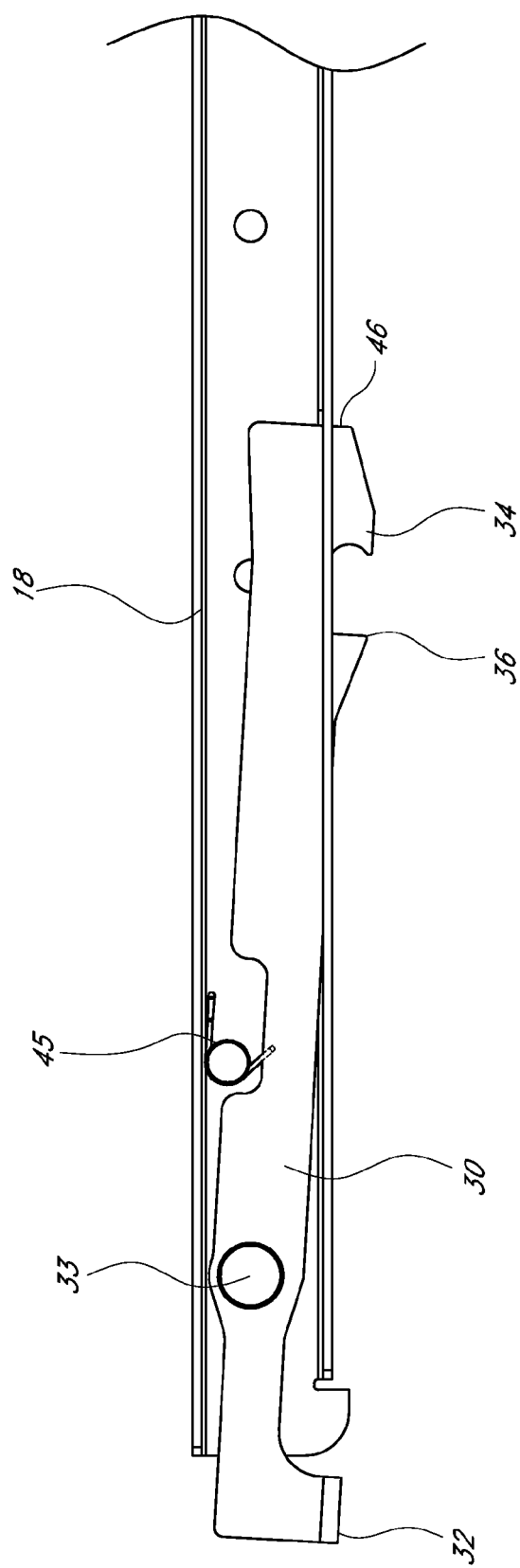
FIG. 7 is a side view of a forward portion of the inner slide segment of the slide assembly of FIG. 1 illustrating a portion of a locking mechanism.

FIG. 7 illustrates the inner slide segment 18 and the lock arm 30a of the lock mechanism 30. As described above, preferably, the lock arm 30a is rotatably coupled to the inner slide segment 18 by a bearing support, such as a rivet or pin 33. The lock mechanism 30 can rotate about the axis of the pin 33. At one end, the lock mechanism 30 includes the actuation portion 32, and at the other end, the latch arrangement (e.g., the first latch portion 34 and second latch portion 36). In a closed position of the slide assembly 10, the first and second latch portions 34, 36 are longitudinally aligned with the opening 50 and, respectively, the first and second recesses 54, 52. In the closed position, the first latch portion 34 extends into the first recess 54 and the second latch portion 36 extends into the second recess 52. The first latch portion 34 can engage the first recess 54 to inhibit or prevent the inner slide member 18 from moving toward the open position. The second latch portion 36 can engage the second recess 54 to inhibit or prevent the inner slide member 18 from moving further in a direction toward the closed position.

Preferably, a spring 45 is supported by the inner slide segment 18 and arranged to bias the lock arm 30a toward a locking position so that the latch portions 34, 36 are biased downward toward the opening 50 and first and second recesses 54, 52. Thus, when aligned with the recesses 54, 52, the latch portions 34, 36 are biased into the locking position. The first latch portion 34 also includes a lock surface or abutting surface 46, which can be a vertical or substantially vertical surface. The lock surface 46 contacts the intermediate slide segment 16 to lock the inner slide segment 18 in an extended position relative to the intermediate slide segment 16. The actuation portion 32 can be utilized to unlock the inner slide segment 18 and allow retraction relative to the intermediate slide segment 16. In the illustrated arrangement, the lock surface 46 is defined by an end surface of the latch arm 30a, which abuts a forward end surface of the intermediate slide segment 16.

A ramped surface of the rearward end of the first latch portion 34 can contact the intermediate slide segment 16 or outer slide segment 14, once the lock surface 46 has been released, to rotate the lock mechanism 30 against the biasing force of the spring 45 toward an unlocked position to allow retraction of the inner slide segment 18. Similarly, a ramped surface of a forward end of the second latch portion 36 can contact the intermediate slide segment 16 or outer slide segment 14 to rotate the lock mechanism 30 against the biasing force of the spring 45 toward an unlocked position to allow extension of the inner slide segment 18. Thus, the ramped surfaces of the latch portions 34, 36 can facilitate desired movement of the inner slide segment 18 relative to the intermediate slide segment 16 and outer slide segment 14 in between the fully open and closed positions and inhibit the lock arm 30a from getting hung up on the intermediate slide segment 16, outer slide segment 14 or other structure of the slide assembly 10 during such movement.

Figure 8:
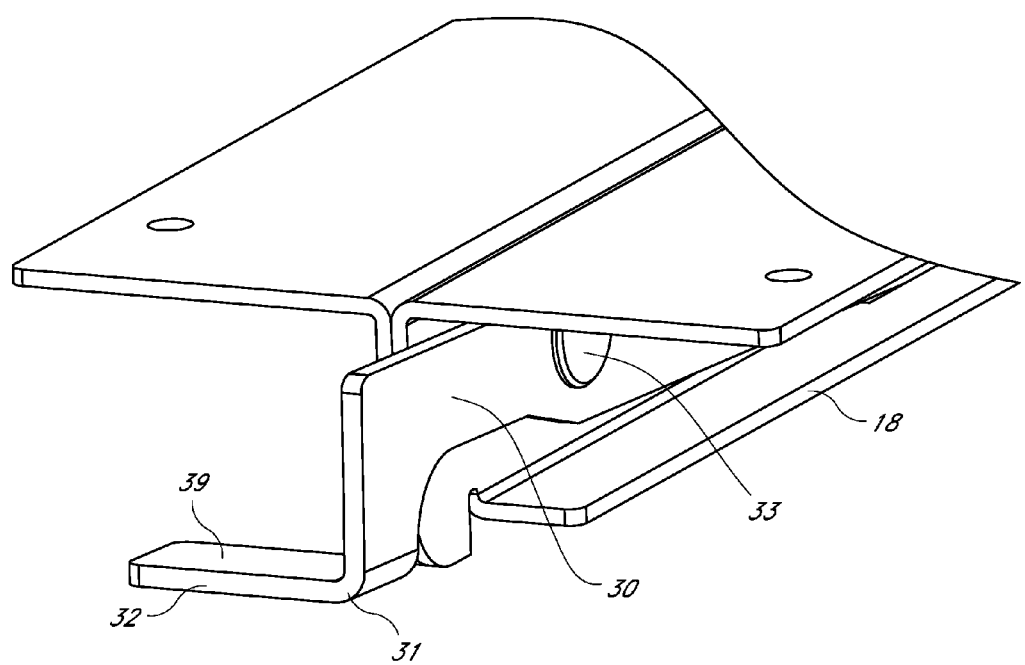
FIG. 8 is a perspective view of a forward portion of the inner slide segment of the slide assembly of FIG. 1 illustrating a forward end portion of the locking mechanism.

As described, the lock mechanism 30 includes the actuation portion 32, which preferably is positioned near the forward end of the inner slide segment 18 so that it can be conveniently actuated by a user. By applying a force to the actuation portion 32, a user can pivot the lock mechanism 30 and release the first latch portion 34 from the first recess 54. Preferably, when a user moves the actuation portion 32 downward, this causes the first latch portion 34 and the second latch portion 36 to move upward and away from the first and second recesses 52, 54 so that the inner segment 18 can move toward the open position. As illustrated in FIG. 8, the actuation portion 32 is preferably arranged so that it can be easily and quickly located and actuated by a user, even when the user is wearing heavy gloves that may significantly reduce dexterity. Preferably, the actuation portion 32 includes a bend 31 and a horizontal or laterally-extending portion or tab 39 extending in a horizontal or lateral direction from the main portion of the lock mechanism 30. The bend 31 and the horizontal tab 39 provide a surface that facilitates actuation by a user and allows a user to more easily apply an actuation force to the actuation portion 32. To facilitate use by a gloved hand, preferably the tab 39 is at least about 15 millimeters and more preferably at least about 19 or 20 millimeters wide (i.e., dimension in a lateral direction of the slide assembly 10).

The slide assembly 10 preferably includes one or more stop arrangements that define certain positions of the slide assembly 10, such as the open position and closed position, or certain relative positions of the slide segments 14, 16, 18. As described above, because the disclosed slide assemblies 10 are often used in emergency vehicle environments, the slide assemblies 10 are often exposed to large forces as a result of the drawers or other objects supported by the slide assemblies 10 being rapidly and forcefully opened or closed. Accordingly, the novel designs of the stop arrangements described herein were developed to withstand and dissipate such forces to provide the slide assemblies with a long service life.

Figure 9:
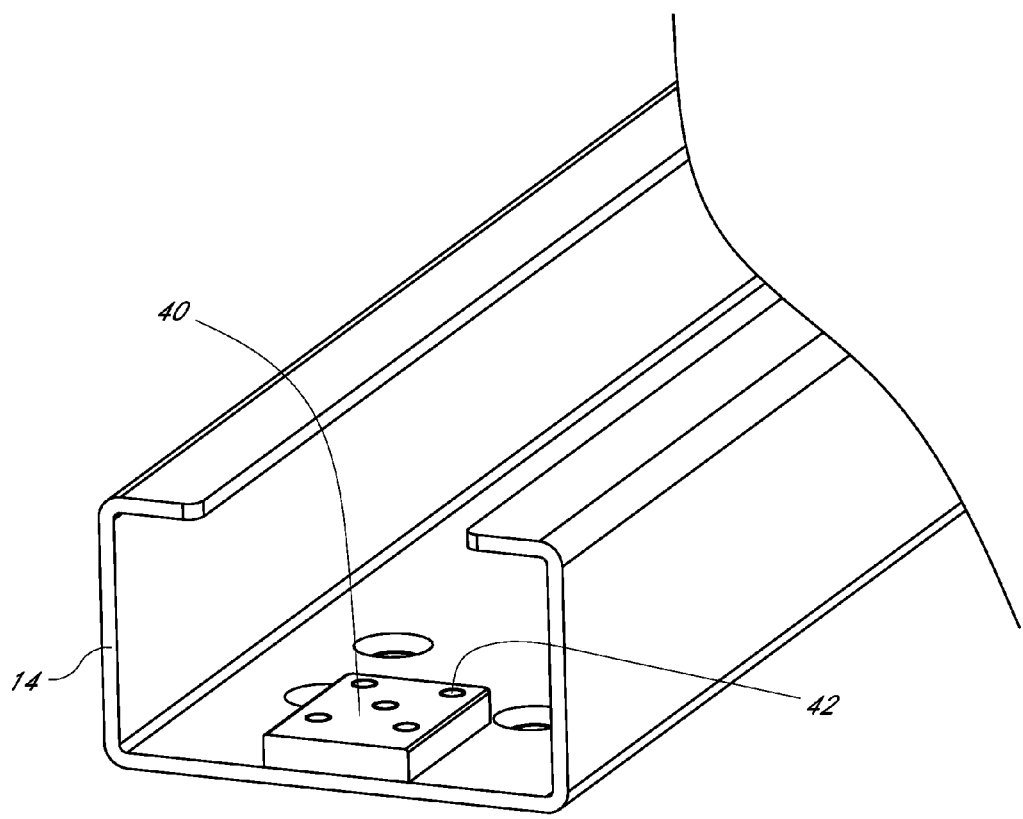
FIG. 9 is a perspective view of a rearward portion of the outer slide segment of the slide assembly of FIG. 1 illustrating a stop member.
Figure 10:
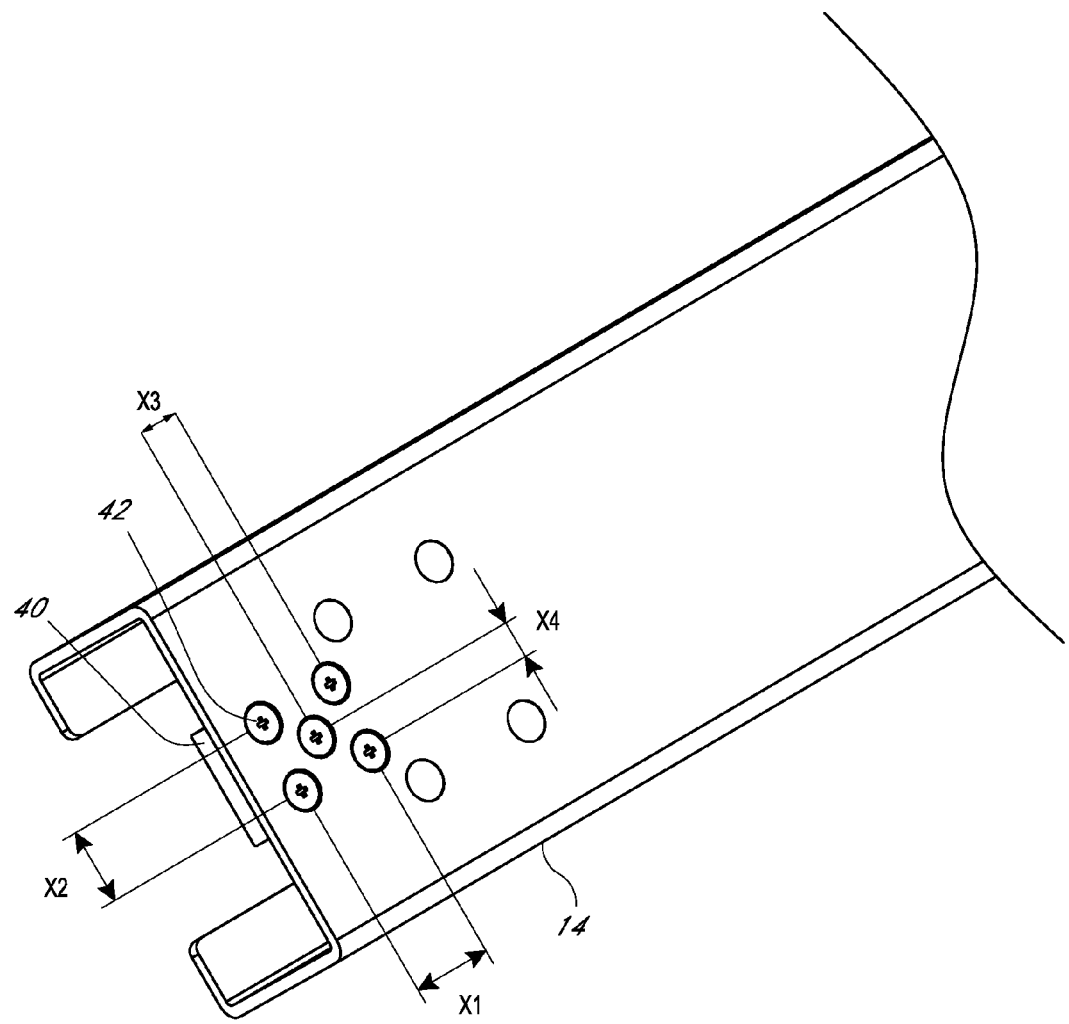
FIG. 10 is a bottom perspective view of a rearward portion of the outer slide segment of the slide assembly of FIG. 1 illustrating a coupling arrangement that couples the stop member to the outer slide segment.

FIGS. 9 and 10 illustrate the outer segment 14 and the closed-position stop member 40. Preferably, the stop member 40 is coupled to the outer segment 14 at or near the end of the segment 14 and is arranged to inhibit movement of the inner and/or intermediate slide segments 16 and 18 past the closed position. The stop member 40 is preferably coupled to the outer segment 14 by multiple fasteners 42 (e.g., pins, rivets or screws) that extend through the outer segment 14 and at least partially into the stop member 40. In a preferred embodiment, the stop member 40 is coupled to the outer segment by more than two screws 42 and, specifically, by five screws 42. The stop member 40 is preferably generally rectangular with a depth between about 0.2 and 0.3 inches. The stop member 40 preferably has a length of about 1.4 inches. The stop member 40 also preferably has a width of about 1.0 inch. Preferably, the stop member 40 is made of a metal material such as steel, which can be the same material as or a different material from the outer slide segment 14. In the illustrated arrangement, the stop member 40 contacts only the intermediate slide segment 16.

The stop member 40 represents a significant improvement over many prior art stops and significantly increases the durability and longevity of the slide assembly 10. As discussed, the slide assembly 10 is often used in emergency vehicle applications and is subjected to high loads and high closing forces. The illustrated stop member 40 spreads the load transferred from the stop member 40 to the slide segment 14 through several cross-sectional surface locations that are separated and spaced from one another, preferably in both longitudinal and lateral directions. As a result, the step member 40 can handle repeated closing forces that are high in magnitude without failure or significant deformation of the slide segment 14, thereby increasing the usable lifespan of the slide assembly 10. In the illustrated arrangement, the dimension X1 is about 0.75 inches (19 mm), the dimension X2 is about 0.6 inches (15 mm), the dimension X3 is about 0.375 inches (10 mm), and the dimension X4 is about 0.3 inches (8 mm).

Figure 11:
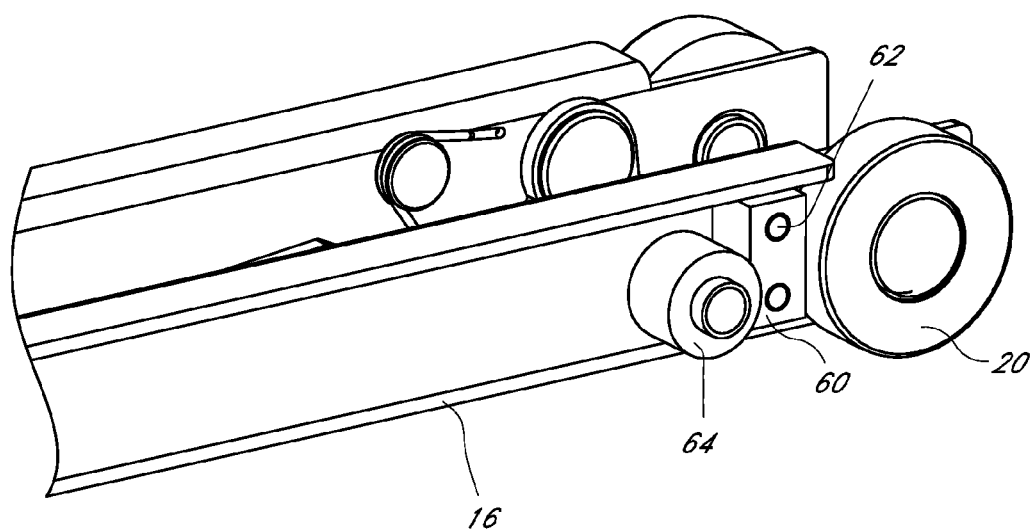
FIG. 11 is a perspective view of a rearward portion of the intermediate slide segment of the slide assembly of FIG. 1 illustrating a stop assembly.
Figure 12:
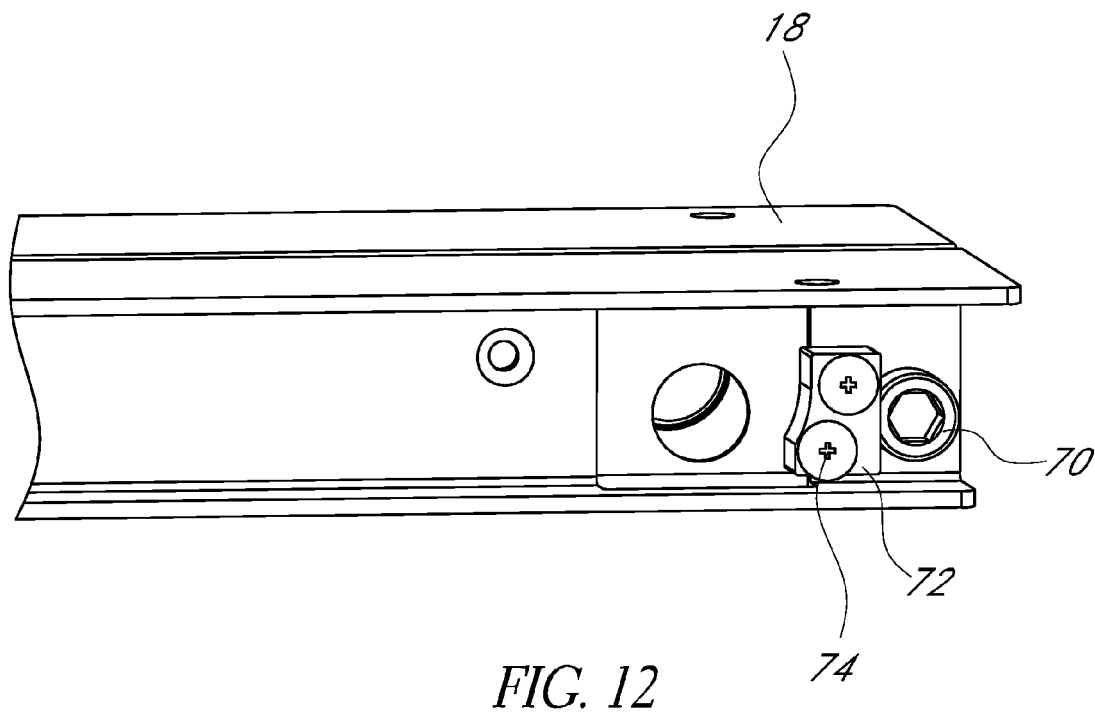
FIG. 12 is a perspective view of a rearward portion of the inner slide segment of the slide assembly of FIG. 1 illustrating a stop assembly.

FIGS. 11 and 12 illustrate first and second open-position stop members 60 and 72, respectively. For clarity, not all of the slide segments are illustrated in FIGS. 11 and 12. With reference to FIG. 11, the first open-position stop member 60 is coupled to the intermediate slide segment 16 preferably near the end of the intermediate segment 16. The stop member 60 is preferably coupled to the intermediate segment 16 by one or more rivets, or screws 62. A pin 64 is coupled to the outer segment 14 (not shown in FIG. 11) and is aligned with the stop member 60 so that the pin 64 contacts the stop member 60 when the slide assembly 10 is in the open position. The stop member 60 is positioned to inhibit the pin 64 from moving beyond the open position which inhibits the intermediate segment 16 from moving away from the outer segment 14 beyond the open position. Accordingly, the rollers 22 do not act as stopping members or engage any stop members in the opened or closed positions.

With reference to FIG. 12, the second open-position stop member 72 is coupled to the intermediate segment 16 (not shown in FIG. 12), preferably by multiple rivets or screws 74. A stop member 70, such as a pin or screw, is coupled to the inner segment 18 and is aligned with the stop member 72 so that it contacts the stop member 72 when the slide assembly 10 is in the open position. The stop member 72 is arranged in a position to inhibit the pin 70 and the inner segment 18 from moving beyond the open position with respect to the intermediate segment 16. Accordingly, the rollers 20 do not act as stopping members, nor do they engage any stop members in order to prevent movement of the slide segments 14, 16, 18 beyond the open position. However, in other arrangements, the rollers 20 or 22 could be used as stop members.

Figure 13:
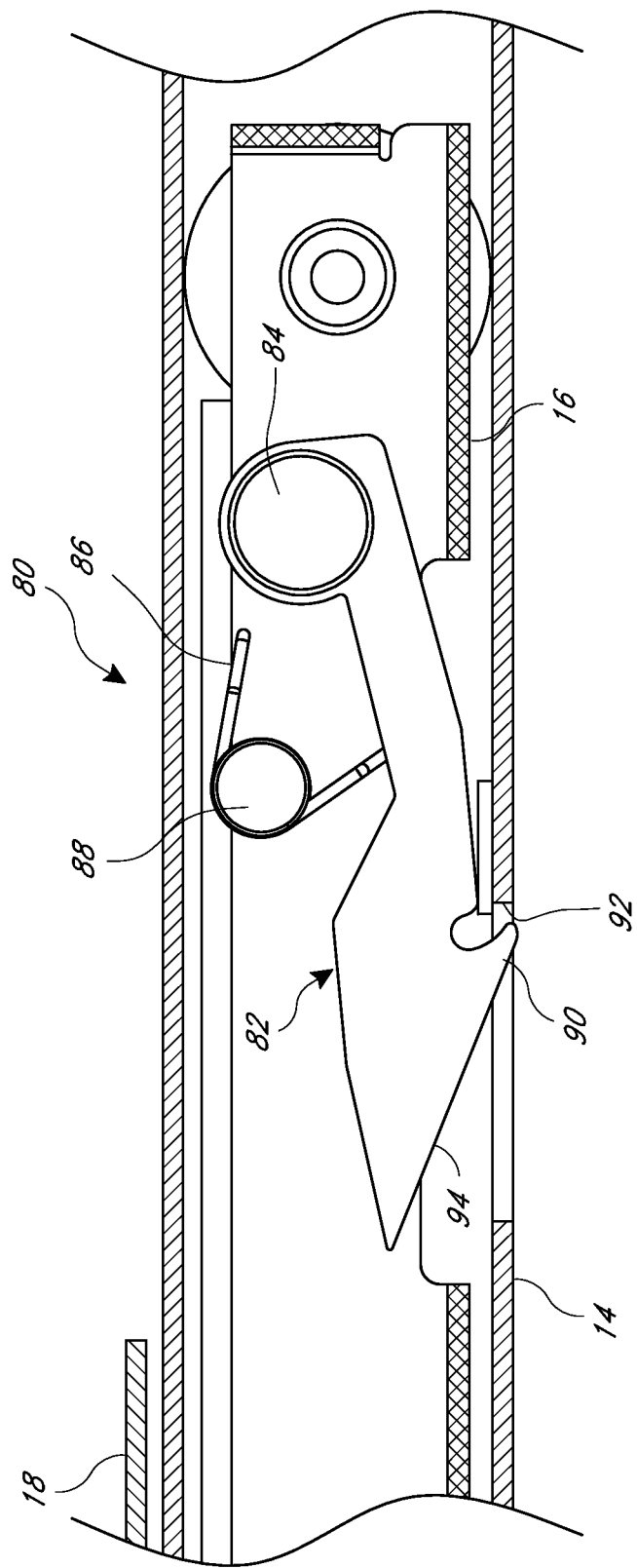
FIG. 13 is a longitudinal cross-section of the slide assembly of FIG. 1 illustrating a lock mechanism that selectively secures the intermediate slide segment in an open position relative to the outer slide segment.

With reference to FIG. 13, preferably, the slide assembly 10 also includes a lock mechanism 80 that selectively locks the intermediate slide segment 16 in a desired position or positions relative to the outer slide segment 14. In particular, the lock mechanism 80 preferably locks the intermediate slide segment 16 in an open or extended position relative to the outer slide segment 14 until released by the retraction of the inner slide segment 18. Thus, the lock mechanism 80 ensures proper sequencing of the slide segments 16 and 18 during closing of the slide assembly 10. The illustrated lock mechanism 80 includes a latch or lock arm 82 that is carried by, and rotatably supported relative to, the intermediate slide segment 16 by a support member 84, such as a pin or rivet. A biasing member, such as a spring 86, biases the lock arm 82 toward an engaged position (downward in the illustrated orientation). The illustrated spring 86 is a torsion spring secured to the intermediate slide segment 16 by a support member 88, such as a pin or rivet. One end of the spring 86 is fixed to the intermediate slide segment 16 and the other end of the spring 86 engages the lock arm 82.

The lock arm 82 includes a latch portion or hook 90, which is configured to engage a stop surface defined by a slot or opening 92 within the outer slide segment 14. The hook 90 is shaped to inhibit or prevent rearward movement of the intermediate slide segment 16 relative to the outer slide segment 14 when the lock arm 82 is in the locked or engaged position. A forward-facing end portion of the lock arm 82 defines a disengagement surface, which is contacted by the inner slide segment 18, or a member carried by the inner slide segment 18, upon retraction of the inner slide segment 18. In the illustrated arrangement, the disengagement surface is a ramped surface 94, which when contacted by the inner slide segment 18 during retraction, causes the lock arm 82 to rotate away from the engaged position and release the intermediate slide segment 16.

Figure 14:
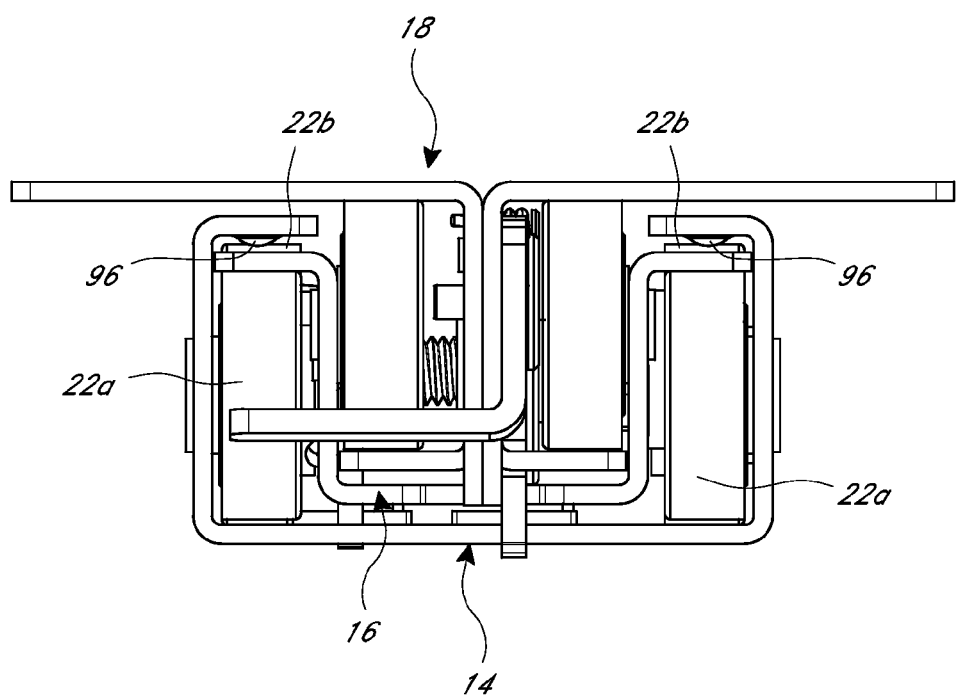
FIG. 14 is a front view of the slide assembly of FIG. 1, which illustrates an anti-vibration arrangement that limits relative vertical movement between the intermediate segment and the outer segment.
Figure 15:
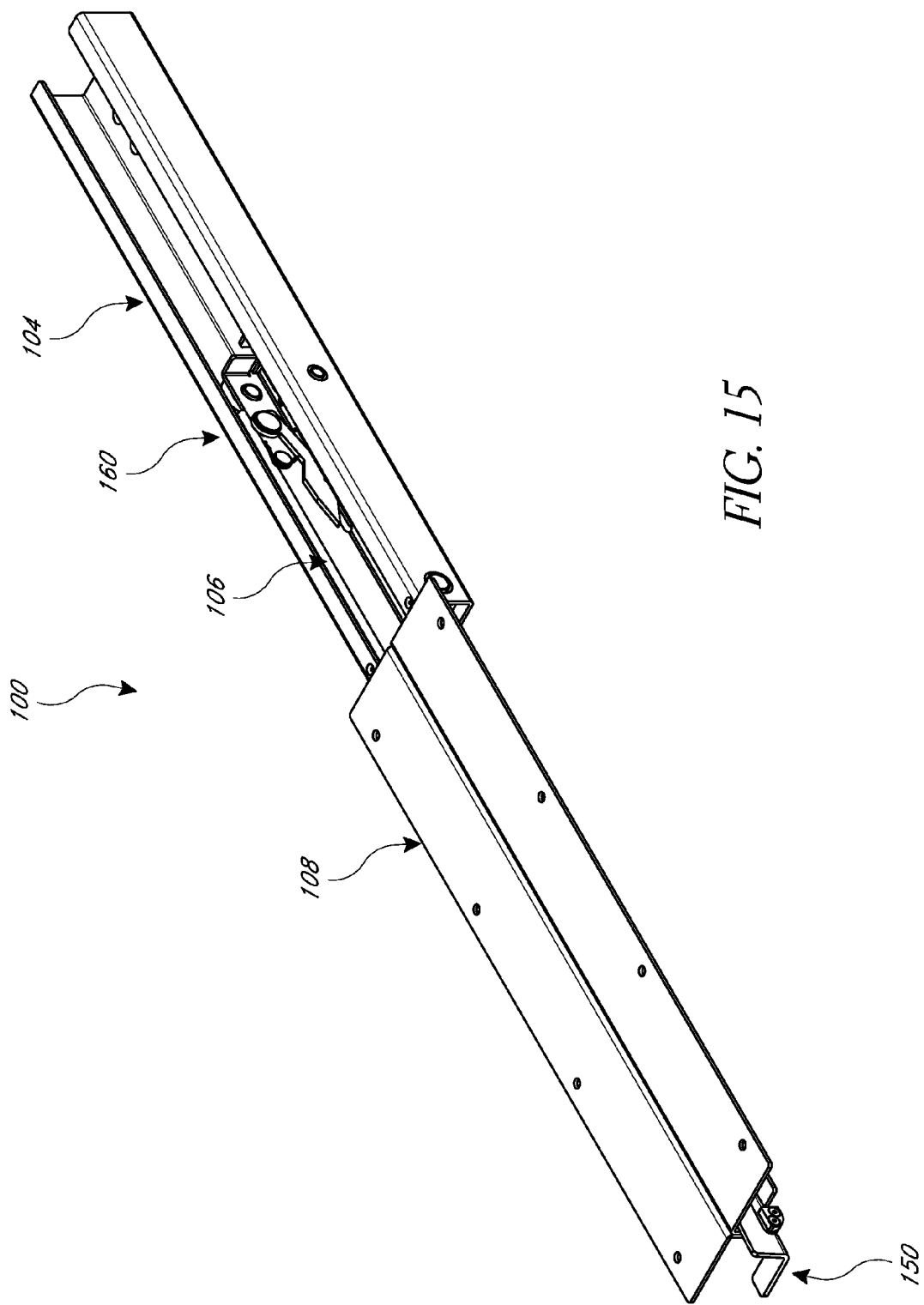
FIG. 15 is a perspective view of another embodiment of a slide assembly having an outer slide segment, an intermediate slide segment and an inner slide segment, and shown in an open position.
Figure 16:
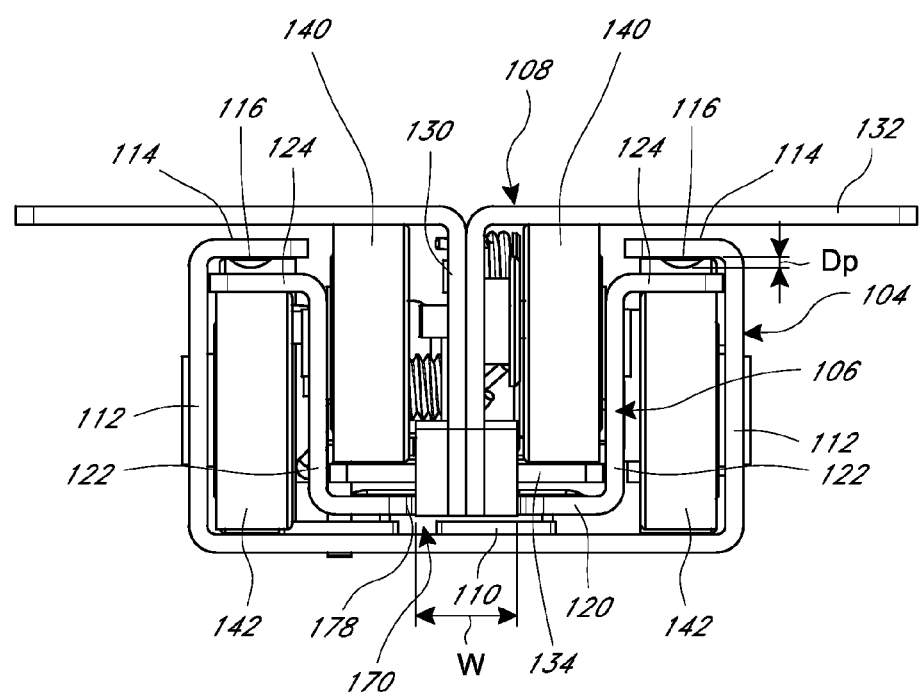
FIG. 16 is a front view of the slide assembly of FIG. 15.
Figure 17:
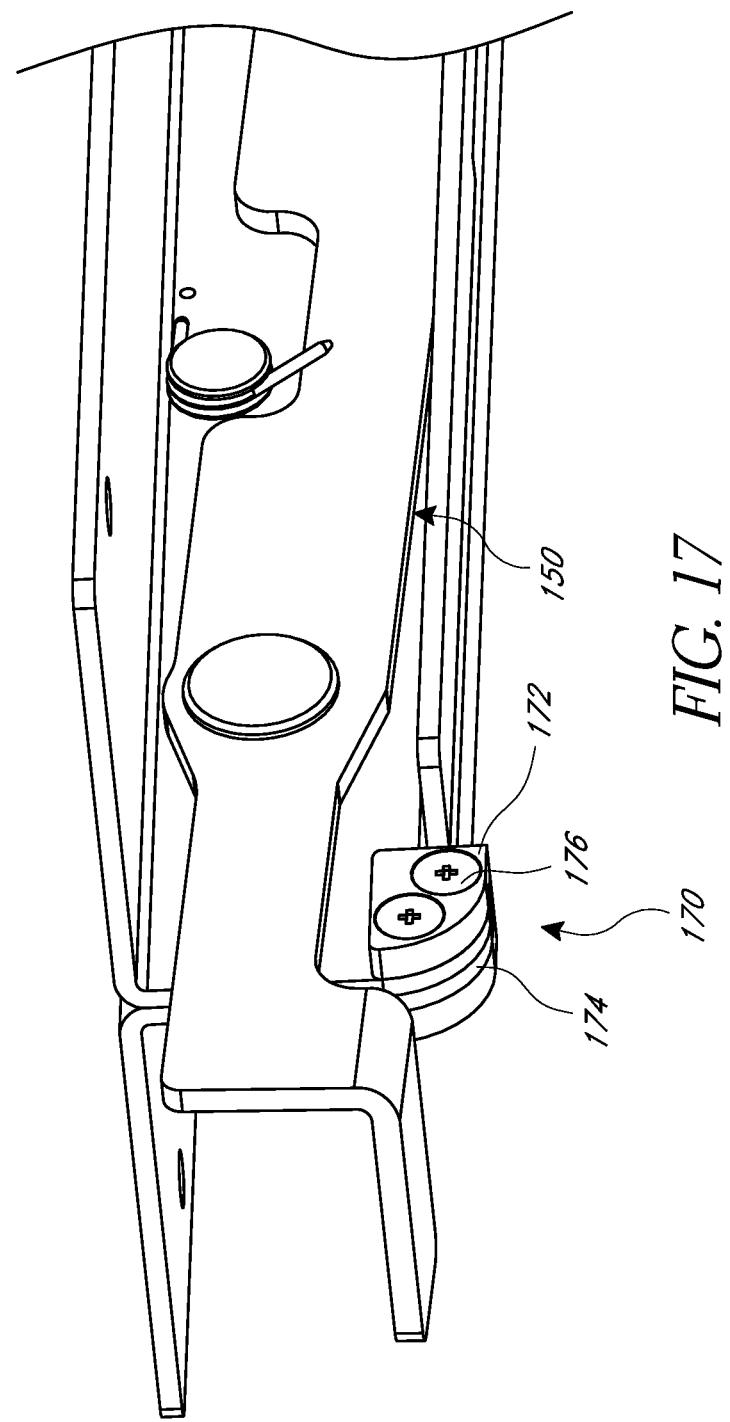
FIG. 17 is a perspective view of a front portion of the inner slide segment of the slide assembly of FIG. 15.
Figure 18:
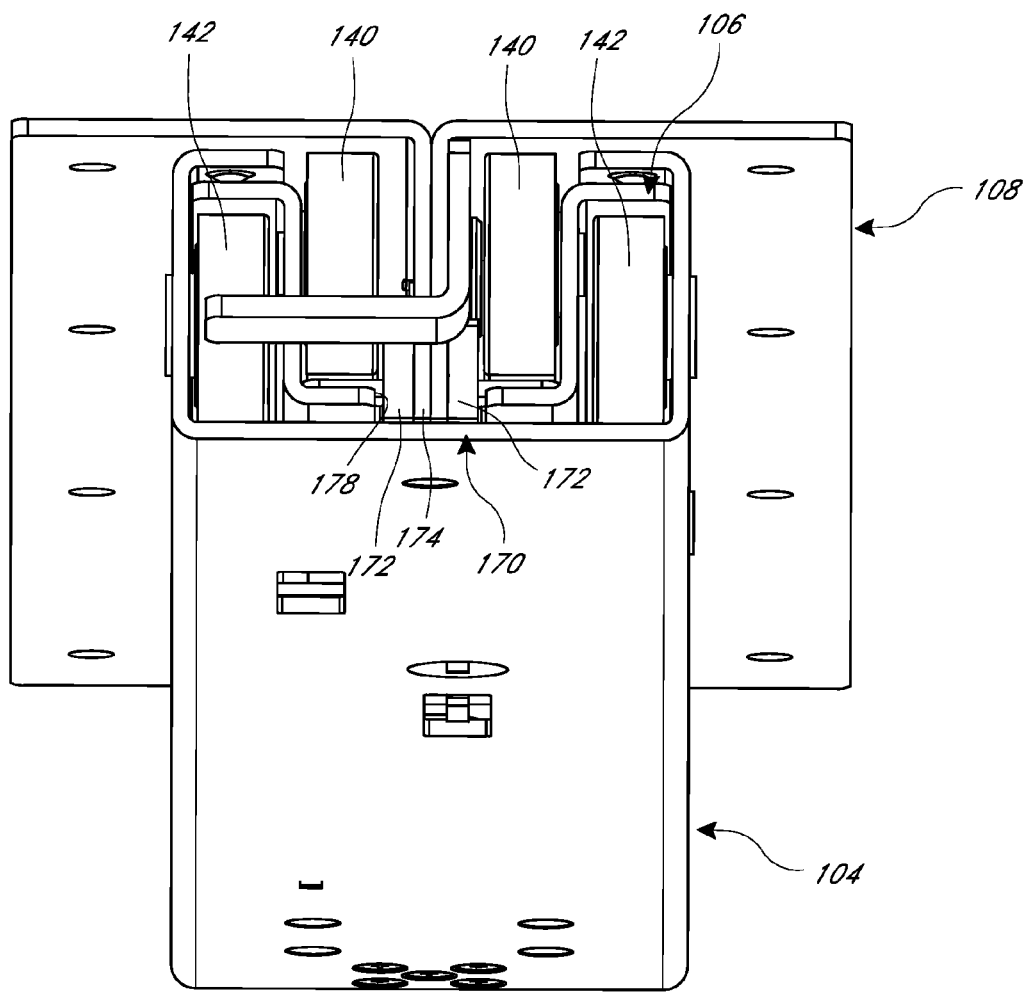
FIG. 18 is a view of the front and bottom of the slide assembly of FIG. 15.
Figure 19:
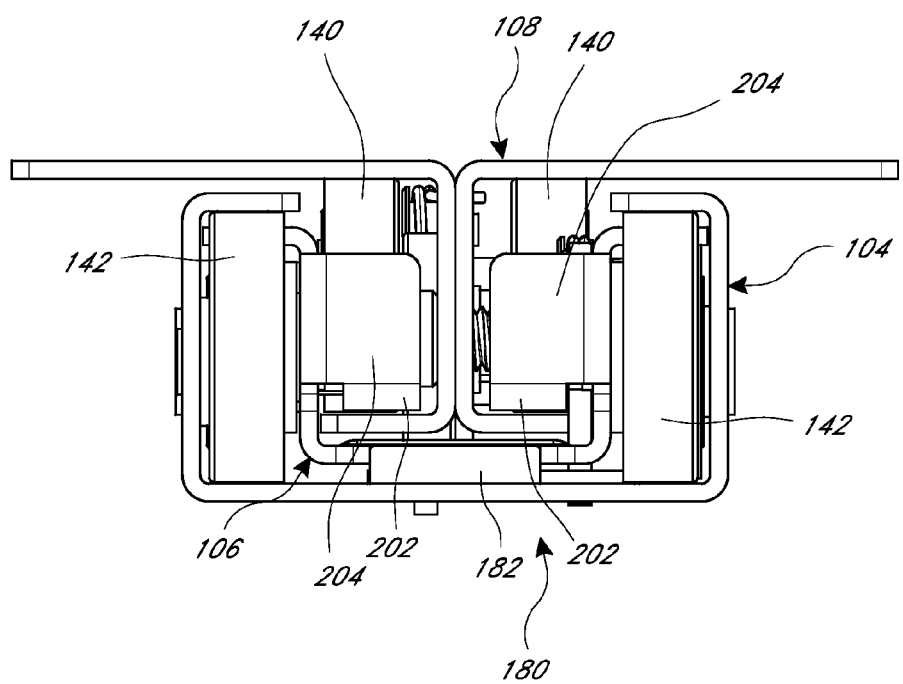
FIG. 19 is a rear view of the slide assembly of FIG. 15.
Figure 20:
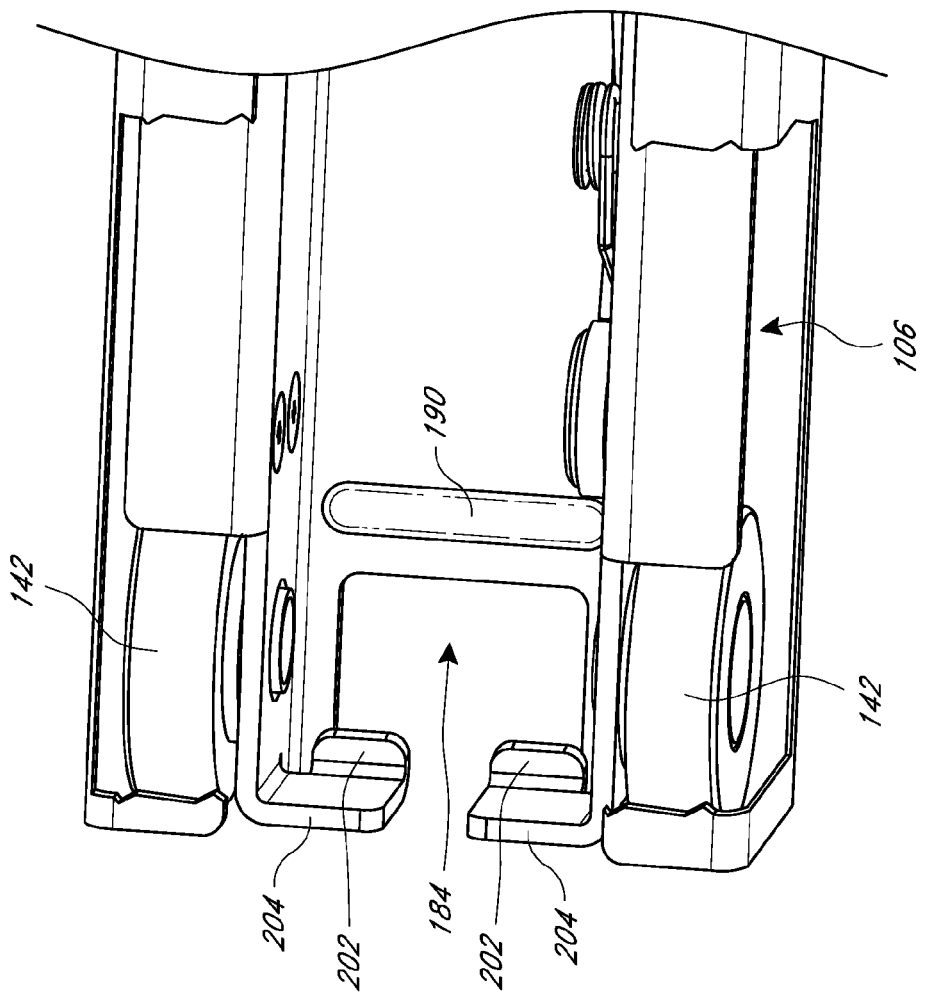
FIG. 20 is a top view of a rear portion of the slide assembly of FIG. 15 with portions of the inner slide segment and outer slide segment broken away.
Figure 21:
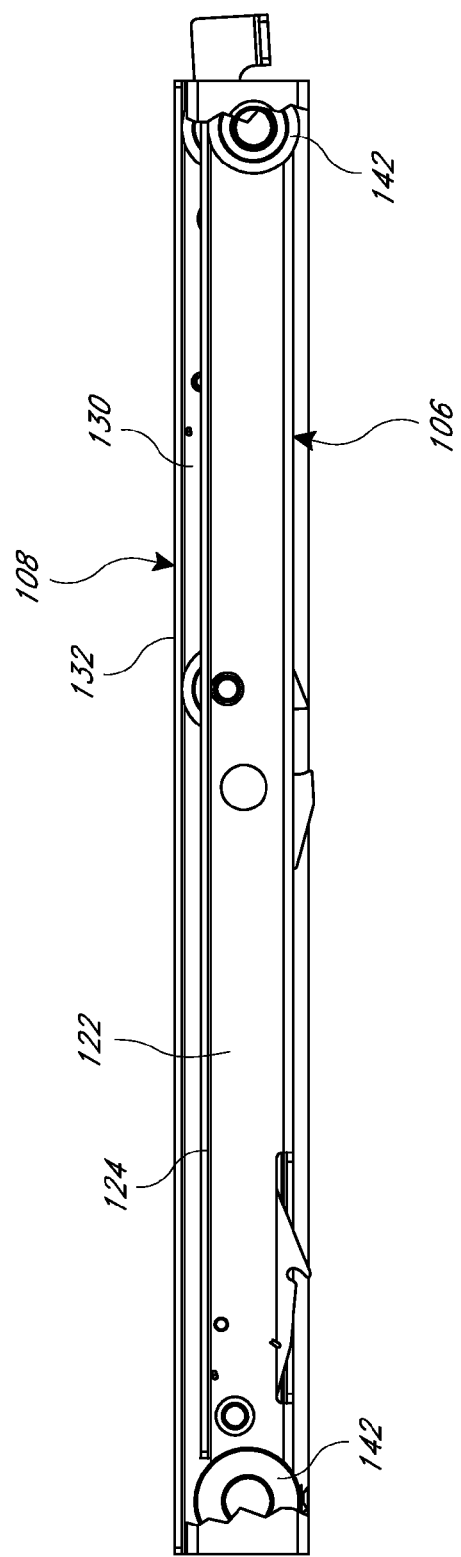
FIG. 21 is a side view of the slide assembly of FIG. 15 with a portion of the outer slide segment broken away.

With reference to FIG. 14, preferably, the slide assembly 10 also includes one or more features that inhibit vibrations or other dynamic vertical loads from causing damage to the slide assembly 10. Such features are often generally referred to herein as "anti-vibration" features. In many instances, the so-called anti-vibration features limit relative vertical movement between two or more slide segments in comparison to the vertical movement that would otherwise be available. The available vertical movement is often the clearance between a roller and the surfaces constraining movement of the roller in a vertical (upward and/or downward) direction. Anti-vibration features can also limit fore and aft movement of slide segments or spread a load applied from one segment to another segment over a larger contact area.

FIG. 14 is a front view of the slide assembly 10, which illustrates downwardly-projecting dimples or protrusions 96 formed in the return portions of the channel-shaped outer slide segment 14 such that a distance between the bottom of the protrusion 96 and the upper surface of the web of the outer slide segment 14 is less than the distance between the lower surface of the flange of the outer slide segment 14 and the web of the outer slide segment 14. The protrusions 96 project toward flange portions of the intermediate slide segment 16 and contact the flange portions of the intermediate slide segment 16 in the event of vibrations or other vertical loads tending to cause the intermediate slide segment 16 to move upwardly relative to the outer slide segment 14 to limit such movement. As is known, a certain amount of vertical movement is usually inherent in roller slides, such as the illustrated slide assembly 10 because the rollers 20, 22 cannot be in contact with upper and lower portions of a slide segment at the same time, as it would interfere with rotation of the rollers 20, 22.

Preferably, the distance that the protrusions 96 project downwardly from the bottom surface of the flanges is sized to be less than the total amount of available vertical movement between the intermediate slide segment 16 and the outer slide segment 14 absent the protrusions 96. In some arrangements, this distance can be approximately one-half or more of the total amount of available vertical movement between the intermediate slide segment 16 and the outer slide segment 14 absent the protrusions 96. In other arrangements, the distance could be less than one-half of the total amount of available vertical movement between the intermediate slide segment 16 and the outer slide segment 14 absent the protrusions 96. Advantageously, the protrusions 96 limit the amount of vertical movement between the intermediate slide segment 16 and the outer slide segment 14, while maintaining desirable or necessary clearance along the remainder of the length of the slide assembly 10.

As apparent in FIG. 14, preferably, the rear pair of rollers 22b has a larger diameter than the forward pair of rollers 22a. As a result, the rear pair of rollers 22b preferably limits the vertical movement between the intermediate slide segment 16 and the outer slide segment 14 in a rearward portion of slide assembly 10. In some arrangements, the size of the rear pair of rollers 22b is selected to provide a similar limit on vertical movement as the protrusions 96 described immediately above. Additional details regarding preferred arrangements of anti-vibration features are described below in connection with the slide assembly of FIGS. 15-21.

FIGS. 15-21 illustrated a slide assembly 100 that is similar in many respects to the slide assembly 10 of FIGS. 1-14. Accordingly, not all of the features of the slide assembly 100 are described in detail below. Features that are not described can be assumed to be similar to corresponding features in the slide assembly 10. The illustrated slide assembly 100 includes an outer slide segment 104, an intermediate slide segment 106 and an inner slide segment 108 that are shaped the same as or substantially similar to the corresponding segments 14, 16, 18 of the slide assembly 10. In some arrangements, the intermediate slide segment 106 could be omitted or the slide assembly 100 could include multiple (e.g., 2, 3 or more) intermediate slide segments 106. The slide segments 104, 106, 108 are telescopically engaged with one another to move between a closed or retracted position and an open or extended position. The slide segments 104, 106, 108 can be constructed of any suitable material by any suitable process. In one arrangement, the slide segments 104, 106, 108 are made from a steel material. Preferably, flat patterns of the sheet metal are cut on a laser machine or a turret press. The slide segments 104, 106, 108 can also be formed from a steel or other metal material by other suitable processes, such as a roll forming process, progressive die tooling, etc. In addition, other suitable materials (e.g., aluminum, plastic) or other suitable processes (e.g., extrusion, injection molding) could also be used.

Preferably, the outer slide segment 104 is constructed as a channel and, in particular, has a substantially C-shaped cross-sectional profile. The illustrated outer slide segment 104 includes a web portion or web 110, a pair of side walls 112 extending in the same direction (i.e., upwardly, in the illustrated orientation) from opposite side edges of the web 110, and a pair of return flanges or returns 114 extending inwardly from a respective one of the edges of the side walls 112 that is opposite the web 110. Similar to the slide 10, each return 114 of the outer slide segment 104 of the slide assembly 100 preferably includes a protrusion 116 positioned at or near a forward end portion of the outer slide segment 104 and that extends toward another of the slide segments 106 or 108. In the illustrated arrangement, the protrusions 116 extend towards the intermediate slide segment 106 (i.e., in a downward direction in the illustrated orientation) and operate to limit relative vertical movement between the intermediate slide segment 106 and the outer slide segment 104. The protrusions 116 extend downwardly from a lower surface of the returns 114 a distance D. The distance $D_p$ preferably is selected to limit relative vertical movement between the intermediate slide segment 106 and the outer slide segment 104 to an amount that is less than is otherwise available. As described above with respect to the slide assembly 10, the protrusions 116 can be sized to limit relative vertical movement to approximately one-half or more of the total amount of available vertical movement between the intermediate slide segment 106 and the outer slide segment 104 absent the protrusions 116. In other arrangements, the distance could be less than one-half of the total amount of available vertical movement between the intermediate slide segment 106 and the outer slide segment 104 absent the protrusions. Advantageously, the protrusions 116 limit the amount of vertical movement between the intermediate slide segment 106 and the outer slide segment 104, while maintaining desirable or necessary clearance along the remainder of the length of the slide assembly 100. The protrusions 116 preferably are generally or substantially rounded in shape, such as a partial sphere, for example. However, other shapes may also be used. In one arrangement, the distance $D_p$ is about 1.5 millimeters or at least about 1.5 millimeters and the protrusions 116 have a diameter (or maximum dimension) of at least about 7.5 millimeters and, in one arrangement, about 7.6 millimeters.

The intermediate slide segment 106 preferably is shaped as a channel. In particular, the illustrated intermediate slide segment 106 has a generally or substantially U-shaped cross-sectional profile and includes a web portion or web 120, a pair of side walls 122 that extend in the same direction (i.e., upwardly, in the illustrated orientation) from opposite side edges of the web 120, and a pair of flanges 124 that extend in opposite directions (i.e., outwardly, in the illustrated orientation) from one another from respective edges of the side walls 122 that are opposite the web 120. The intermediate slide segment 106 is sized and shaped such that the flanges 124 are generally or substantially aligned with the returns 114 in a lateral direction or width direction of the slide assembly 100. Accordingly, the protrusions 116 are arranged to contact the flanges 124 to inhibit undesired or excessive relative vertical movement between the outer slide segment 104 and the intermediate slide segment 106.

The inner slide segment 108 preferably is a generally or substantially I-beam shape in cross-sectional profile and includes vertical web portion or web 130, a mounting portion 132 (also referred to as an upper flange or upper platform 132) that is positioned above the web 130 and a lower flange 134 that is positioned below the web 103. In the illustrated arrangement, the platform 132 is centered in a lateral direction above the web 130 and extends outwardly beyond the side walls 112 of the outer slide segment 104. The drawer (or other object) can be coupled to the platform 132 by any suitable arrangement, such as by a plurality of fasteners (not shown) passing through one or more mounting holes in the platform and into the drawer (or other object). In one preferred arrangement, the platform 132 is constructed from a pair of generally C-shaped channel members that are coupled to one another to form the I-beam shaped segment 108. Accordingly, the web 130 has a total wall thickness that is twice that of the wall thickness of the platform 132 and/or lower flange 134. The C-shaped channel members can be coupled by any suitable arrangement, such as fasteners (e.g., screws, rivets) or welding, for example. In other arrangements, the inner slide segment 108 could be constructed from a single piece of material, such as by an extrusion process, in which the wall thicknesses of the web 130 and platform 132 can be the same or different.

Preferably, similar to the slide assembly 10, the segments 104, 106, 108 of the slide assembly 100 are supported relative to one another by motion transfer arrangements, such as bearing or rollers. In the illustrated arrangement, the inner slide segment 108 is supported for movement relative to the intermediate slide segment 106 by at least and preferably only two pairs of rollers 140. A first pair of rollers 140 is coupled to the intermediate slide segment 106 at or near a forward end thereof and a second pair of rollers 140 is coupled to the intermediate slide segment 106 at an intermediate location thereof. The rollers 140 contact a lower surface of the platform 132 of the inner slide segment 108 and support the inner slide segment 108 for movement relative to the intermediate slide segment 106. In addition, the intermediate slide segment 106 is supported for movement relative to the outer slide segment 104 by at least and preferably only two pair of rollers 142. A first pair of rollers 142 is coupled to the outer slide segment 104 at or near a forward end thereof and a second pair of rollers 142 is coupled to the intermediate slide segment 106 at or near a rearward end thereof. The forward pair of rollers 142 contacts the underneath surfaces of the flanges 124. The rearward pair of rollers 142 rests on the web 110 of the outer slide segment 104 or contacts the underneath surfaces of the flanges 114 depending on the location and/or loading conditions on the inner slide segment 108. The rollers 140, 142 are spaced on opposite lateral sides of the slide assembly 100.

The illustrated slide assembly 100 also includes a first lock arrangement 150 and a second lock arrangement 160. The first lock arrangement 150 preferably is operable to selectively secure the inner slide segment 108 in an open position and in a closed position. The first lock arrangement 150 is manually operable to release the inner slide segment 108 from the open or closed position. Preferably, the first lock arrangement 150 is structurally and functionally similar or identical to the lock mechanism 30 of the slide assembly 10. The second lock arrangement 160 preferably is operable to selectively secure the intermediate slide segment 106 in a locked position relative to the outer slide segment 104. Preferably, the second lock arrangement 160 secures the intermediate slide segment 106 in an extended position relative to the outer slide segment 104 when the inner slide segment 108 is extended and releases the intermediate slide segment 106 when the inner slide segment 108 is retracted to facilitate or ensure proper sequencing of the slide segments 106, 108 during closing of the slide assembly 100. Preferably, the second lock arrangement 160 is structurally and functionally similar or identical to the lock mechanism 80 of the slide assembly 10.

The slide assembly 100 can also include various other mechanisms, such as stops configured to limit movement of one slide segment relative to another slide segment. Such stops can be similar or identical to stops 40, 60 or 72 (and related structures) of the slide assembly 10. The stop 40 defines a closed position of the slide segment 16 and stops 60 and 72 define open positions of the slide segments 14, 16, respectively.

Preferably, the slide assembly 100 includes a stop arrangement 170 that defines a closed position of the slide assembly 100, generally, and a retracted position of the inner slide segment 108 relative to the intermediate slide segment 106, in particular. The illustrated stop arrangement 170 includes at least one and preferably a pair of stop members 172 secured to a downwardly-extending tab portion 174 of the inner slide segment 108. The stop members 172 and the tab 174 preferably have a similar or identical shape. The tab portion 174 and stop members 172 cooperate to contact the intermediate slide segment 106 when the inner slide segment 108 is retracted or to define a retracted position of the inner slide segment 108. The provision of the stop members 172 increases the total width W of material that contacts the intermediate slide segment 106 to a width that is greater than the width of the web 130. Preferably, the width W is at least twice the width of the web 130 and, in some arrangements, can be three times the width of the web 103, or more. Accordingly, the force applied to the intermediate slide segment 106 is spread over a greater area to reduce damage. It has been discovered by the Applicants that contact between the inner slide segment and the intermediate slide segment as a result of vibrations and other impacts (e.g., forceful closing) to the slide assembly 100 tends to damage the intermediate slide segment and reduces the service life of the slide assembly. However, the stop arrangement 170 reduces the damage to the intermediate slide segment 106 and increases the service life of the slide assembly 100.

In the illustrated arrangement, the stop member(s) 172 are separate components from the inner slide segment 108. Such an arrangement allows the stop member(s) 172 to be constructed from a different material than the inner slide segment 108, if desired, to optimize the properties of each. The stop member(s) 172 can be secured to the inner slide segment 108 by any suitable arrangement, such as one or more fasteners 176 (e.g., rivets or screws). In the illustrated arrangement, two threaded fasteners 176 are provided and pass through one stop member 172 and the tab 174, and are received within threaded holes of the other stop member 172. However, in other arrangements, the stop member(s) 172 could be unitary with the inner slide segment 108, such as tab(s) that are folded over to create a double wall thickness stop member. For example, each wall of the web 130 could have a tab portion that is bent over on itself to create a double wall thickness portion. Combined, such an arrangement would have twice the thickness of the remainder of the web 130. In the illustrated arrangement, the stop arrangement 170 is received within a recess 178 extending inwardly from an end surface of the inner slide segment 108. Preferably, the recess 178 is sized (e.g., width and depth) to accommodate the tab 174 and stop members 172 such that the end surface of the inner slide segment 108 is flush with, or generally flush with, the end surface of the intermediate slide segment 106 and/or the outer slide segment 104. The stop arrangement 170 can be considered an anti-vibration feature.

The slide assembly 100 preferably also includes a stop assembly 180 that defines a closed position of the intermediate slide segment 106 relative to the outer slide segment 104. The stop assembly 180 includes a stop member 182 preferably that is identical or similar to the stop member 40 of the slide assembly 10. The stop member 182 is secured to the outer slide segment 104, preferably at or near a rearward end thereof and preferably is located on the web 110 of the outer slide segment 104. Preferably, the stop member 182 contacts a portion of the intermediate slide segment 106, such as a rearward end surface, to define the closed position of the intermediate slide segment 106. The stop member 182 can be secured to the outer slide segment 104 by any suitable arrangement or mechanism, but preferably is secured to the outer slide segment 104 in a manner similar or identical to the stop member 40 of slide assembly 10.

Preferably, the intermediate slide segment 106 includes a recess 184 configured to accommodate the stop member 182. In the illustrated arrangement, the recess 184 extends from the rearward end of the intermediate slide segment 106 and is defined at least partially within the web 120 of the intermediate slide segment 106. Preferably, the recess 184 is defined entirely within the web 120. The recess 184 defines an end surface 186 that is arranged to contact the stop member 182. Preferably, a strengthening element 190 is positioned at or near the end surface 186 to enhance the ability of the intermediate slide segment 106 to withstand impacts against the stop member 182 resulting from vibrations or other movement (e.g., forceful closing) of the intermediate slide segment 106. In the illustrated arrangement, the strengthening element 190 is spaced from the end surface 186. Preferably, the strengthening element 190 is a rib or elongate protrusion that is formed from the material of the web 120. In the illustrated arrangement, the rib 190 (or other strengthening element) extends in an upward direction or in the same direction as the side walls 122. However, in other arrangements, the rib 190 (or other strengthening element) could extend in a downward direction. Preferably, the rib 190 (or other strengthening element) has a length that is the same as, substantially similar or slightly longer than the length of the end surface 186. In the illustrated arrangement, the rib 190 is longer than the end surface 186. The rib 190 (or other strengthening element) increases the resistance to deformation of the end surface 186 and the material of the intermediate slide segment 106 surrounding the end surface 186. It is also believed that the provision of the rib 190 (or other strengthening element) disrupts the transmission or propagation of vibrations through the intermediate slide segment 106 caused by contact between the end surface 186 and the stop member 182, thereby reducing damage to, and increasing the service of, the slide assembly 100.

Preferably, a rearward end of the intermediate slide segment 106 also includes an anti-vibration feature (referred to generally by the reference number 200) that assists in reducing relative vertical movement between the inner slide segment 108 and the intermediate slide segment 106. In particular, the anti-vibration feature 200 includes at least one and preferably a pair of stop members 202 configured to contact the inner slide segment 108 to limit the upward movement of the inner slide segment 108 relative to the intermediate slide segment 106. In the illustrated arrangement, the stop members 202 are tabs that extend from rear wall portions 204 of the intermediate slide segment 106. Preferably, the tabs 202 are formed from portions of the material of the respective rear wall portion 204 that are bent in a forward direction relative to the rear wall portions 204 such that the tabs 202 contact the lower flange 134 of the inner slide segment 108 to limit upward movement of the inner slide segment 108.

As described above, some amount of extra room or play is provided between the rollers 140 and the upper platform 132 and lower flange 134 of the inner slide segment 108 because a single roller 140 cannot be in contact with both the platform 132 and the flange 134 at the same time due to the fact that the upper and lower surfaces of the roller 140 are moving in opposite directions relative to the adjacent surface of the inner slide segment 108. As a result of this necessary play, vibrations applied to the slide assembly 100 in its closed position can cause significant relative vertical movement between the slide segments 104, 106, 108. In the case of the rearward end of the inner slide segment 108, the condition is exacerbated because the rearmost rollers 140 are located at a spaced distance in an intermediate portion of the intermediate slide segment 106. The provision of the tabs 202 limit the vertical movement of the inner slide segment 108 and reduces the damage caused by vibrations imparted on the slide assembly 100 when it is in the closed position.

Preferably, each of the rear pair of rollers 142 of the intermediate slide segment 106 of the slide assembly 100 is larger in diameter than the front pair of rollers 142. In particular, it is preferred that the rearward ends of the flanges 124 are truncated such that they terminate forward of the rear rollers 142. The rear rollers 142 extend at least even with and preferably above the flanges 124. Accordingly, the rear rollers 142 limit the relative vertical movement between the intermediate slide segment 106 and the outer slide segment 104. Preferably, the rear rollers 142 have a diameter that is close to, but somewhat less than, the vertical distance between the upper surface of the web 110 and the bottom surface of the flanges 114 of the outer slide segment 104. As described above, a single one of the rollers 142 cannot contact both the web 110 and the flange 114; however, making the diameter of the rollers 142 fit relatively tightly within the outer slide segment 104 limits vertical movement and damage as a result of vibrations or other loads tending to cause vertical movement. In one arrangement, such as the slide assembly 10, the diameter of the rear rollers 142 is about 1.55 inches and the vertical distance between the upper surface of the web 110 and the bottom surface of the flanges 114 of the outer slide segment 104 is about 1.6008 inches. In the another arrangement, such as the slide assembly 100, the diameter of the rear rollers 142 is about 1.585 inches and the vertical distance between the upper surface of the web 110 and the bottom surface of the flanges 114 of the outer slide segment 104 is about 1.6008 inches. Thus, preferably, the diameter of the rear rollers 142 is at least about 95 percent, between about 97 (e.g., 96.8%) and 99 percent, or, more preferably, about 99 percent of the vertical distance between the upper surface of the web 110 and the bottom surface of the flanges 114 of the outer slide segment 104.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present slide assemblies have been described in the context of particularly preferred embodiments, the skilled artisan will appreciate, in view of the present disclosure, that certain advantages, features and aspects of the assemblies may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A slide assembly, comprising:
   an outer slide segment having a forward end and a rearward end, wherein the outer slide segment comprises a web, a pair of spaced-apart side walls extending from the web and a pair of return flanges extending inwardly from a respective one of the side walls;
   an intermediate slide segment telescopically engaged with the outer slide segment, the intermediate slide segment having a forward end and a rearward end, wherein the intermediate slide segment comprises a web, a pair of spaced-apart side walls and a pair of flanges extending outwardly from a respective one of the side walls;
   an inner slide segment telescopically engaged with the intermediate slide segment, the inner slide segment having a forward end and a rearward end;
   a first plurality of rollers that slidably support the intermediate slide segment relative to the outer slide segment;
   a second plurality of rollers that slidably support the inner slide segment relative to the intermediate slide segment;
   wherein a forward end of each of the pair of return flanges of the outer slide segment comprises a protrusion extending towards a respective one of the flanges of the intermediate slide segment, the protrusion is arranged to contact the flange of the intermediate slide segment to limit vertical movement of the intermediate slide segment relative to the outer slide segment;
   wherein a rearward end of the intermediate slide segment comprises at least one stop member arranged to contact a portion of the inner slide segment to limit vertical movement of the inner slide segment relative to the intermediate slide segment;
   wherein the protrusion comprises a downwardly projecting dimple formed in the return flanges of the outer slide segment.

2. The slide assembly of claim 1, wherein the at least one stop member comprises a pair of stop members that are formed as bent tabs from the material of the intermediate slide segment.

3. The slide assembly of claim 2, wherein the inner slide segment comprises a web, a lower flange and an upper platform, and the pair of stop members are positioned above the lower flange of the inner slide segment.

4. The slide assembly of claim 1, wherein a forward end of the inner slide segment comprises a stop arrangement that contacts at least one of the intermediate slide segment and the outer slide segment to define a closed position of the inner slide segment, wherein the stop arrangement comprises at least one stop member coupled to the inner slide segment, wherein each of the at least one stop member and a portion of the inner slide segment defines a portion of the stop arrangement.

5. The slide assembly of claim 4, wherein the at least one stop member comprises a first stop member and a second stop member, wherein the first stop member and the second stop member are positioned on opposite sides of the portion of the inner slide segment.

6. The slide assembly of claim 4, wherein the stop arrangement contacts only the intermediate slide segment.

7. The slide assembly of claim 1, wherein the outer slide segment includes a stop member at a rearward end, the stop member being coupled to the outer slide segment by a plurality of fasteners, and the stop member contacting at least one of the intermediate and inner slide segments to inhibit the slide assembly from moving beyond the closed position.

8. The slide assembly of claim 7, wherein the intermediate slide segment comprises a strengthening rib positioned near a surface of the intermediate slide segment that contacts the stop member.

9. The slide assembly of claim 7, wherein the stop member only contacts the intermediate slide segment.

10. The slide assembly of claim 1, wherein the first plurality of rollers comprises a forward pair of rollers and a rearward pair of rollers, wherein a diameter of the rearward pair of rollers is greater than a diameter of the forward pair of rollers.

11. The slide assembly of claim 10, wherein the rearward pair of rollers is carried by the intermediate slide segment, wherein the diameter of the rearward pair of rollers is at least 97 percent of a vertical distance between an upper surface of the web and a lower surface of the return flange of the outer slide segment.

12. The slide assembly of claim 11, wherein the diameter of the rearward pair of rollers is about 99 percent of the vertical distance between the upper surface of the web and the lower surface of the return flange of the outer slide segment.

13. The slide assembly of claim 1, wherein the first plurality of rollers comprises at least one forward roller carried by the outer slide segment and at least one rearward roller carried by the intermediate slide segment.

14. The slide assembly of claim 13, wherein the at least one forward roller comprises a first roller that contacts a first flange of the pair of flanges of the immediate slide segment on a first surface of the first flange, and the protrusion is configured to contact a second surface of the first flange, wherein the first surface is on the opposite side of the first flange from the second surface.

15. The slide assembly of claim 14, wherein the at least one forward roller further comprises a second roller that contacts a second flange of the pair of flanges of the immediate slide segment on a first surface of the second flange, and a second protrusion is configured to contact a second surface of the second flange, wherein the first surface is on the opposite side of the second flange from the second surface.

16. A slide assembly, comprising:
   an outer slide segment having a forward end and a rearward end, wherein the outer slide segment comprises a web, a pair of spaced-apart side walls extending from the web and a pair of return flanges extending inwardly from a respective one of the side walls;
   an intermediate slide segment telescopically engaged with the outer slide segment, the intermediate slide segment having a forward end and a rearward end, wherein the intermediate slide segment comprises a web, a pair of spaced-apart side walls and a pair of flanges extending outwardly from a respective one of the side walls;
   an inner slide segment telescopically engaged with the intermediate slide segment, the inner slide segment having a forward end and a rearward end;

a first plurality of rollers that slidably support the intermediate slide segment relative to the outer slide segment, wherein the first plurality of rollers comprises a forward pair of rollers and a rearward pair of rollers and a diameter of the rearward pair of rollers is greater than a diameter of the forward pair of rollers;

a second plurality of rollers that slidably support the inner slide segment relative to the intermediate slide segment;

wherein a forward end of each of the pair of return flanges of the outer slide segment comprises a protrusion extending towards a respective one of the flanges of the intermediate slide segment, the protrusion is arranged to contact the flange of the intermediate slide segment to limit vertical movement of the intermediate slide segment relative to the outer slide segment;

wherein a rearward end of the intermediate slide segment comprises at least one stop member arranged to contact a portion of the inner slide segment to limit vertical movement of the inner slide segment relative to the intermediate slide segment;

wherein a forward end of the inner slide segment comprises a stop arrangement that contacts the intermediate slide segment to define a closed position of the inner slide segment, wherein the stop arrangement comprises a pair of stop members coupled to the inner slide segment, wherein each of the pair of stop members and a portion of the inner slide segment defines a portion of the stop arrangement;

wherein the outer slide segment includes a stop member at a rearward end, the stop member being coupled to the outer slide segment by a plurality of fasteners, and the stop member contacting the intermediate slide segment to define a closed position of the intermediate slide segment, and wherein the intermediate slide segment comprises a strengthening rib extending laterally between the pair of spaced-apart side walls and spaced from a surface of the intermediate slide segment that contacts the stop member.

17. The assembly of claim 16, wherein the slide assembly has a closed position in which the slide segments are telescopically compressed and an open position in which the slide segments are telescopically extended.

18. The slide assembly of claim 16, wherein the first plurality of rollers or the second plurality of rollers comprise a plastic material.

19. The slide assembly of claim 16, wherein the inner slide segment supports a lock mechanism having an actuation portion and a latch portion, the latch portion being configured to engage a recess on the outer slide to inhibit movement of the inner slide segment toward an open position, wherein the actuation portion includes a bend and a horizontal portion that facilitates actuation of the lock mechanism by a user.

20. The slide assembly of claim 16, wherein the intermediate slide segment comprises a strengthening rib positioned near a surface of the intermediate slide segment that contacts the stop member of the outer slide segment.

21. The slide assembly of claim 16, wherein the second plurality of rollers is supported in a cantilevered manner.

22. The slide assembly of claim 16, wherein the second plurality of rollers are secured by a stepped shoulder pin to the intermediate slide segment.

23. The slide assembly of claim 16, wherein the load on the second plurality of rollers is perpendicular to the axis of rotation.

24. The slide assembly of claim 18, wherein the plastic material is an acetal resin.

* * * * *

UNITED STATES PATENT AND TRADEMARK OFFICE
CERTIFICATE OF CORRECTION

PATENT NO. : 8,851,587 B2
APPLICATION NO. : 13/541439
DATED : October 7, 2014
INVENTOR(S) : Brock et al.

Page 1 of 1

It is certified that error appears in the above-identified patent and that said Letters Patent is hereby corrected as shown below:

In the Specification

In column 12 at line 33, Change "D." to --$D_P$.--.

In the Claims

In column 20 at line 5, In Claim 17, change "assembly" to --slide assembly--.

Signed and Sealed this
Twenty-second Day of September, 2015

Michelle K. Lee
*Director of the United States Patent and Trademark Office*